(12) United States Patent
Matsunaga

(10) Patent No.: US 7,734,255 B2
(45) Date of Patent: Jun. 8, 2010

(54) RADIO RESOURCE MANAGEMENT METHOD, MANAGEMENT APPARATUS EMPLOYING THE SAME, BASE STATION, AND TERMINAL

(75) Inventor: Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 1820 days.

(21) Appl. No.: 10/737,118

(22) Filed: Dec. 17, 2003

(65) Prior Publication Data

US 2004/0127259 A1    Jul. 1, 2004

(30) Foreign Application Priority Data

Dec. 24, 2002    (JP) ............... 2002-371877

(51) Int. Cl.
  H04B 1/00    (2006.01)
  H04B 15/00    (2006.01)
(52) U.S. Cl. ............ 455/63.1; 455/67.11; 455/67.13; 455/522; 455/570; 455/452.2; 455/453; 370/342; 370/331; 370/335
(58) Field of Classification Search ........... 455/442, 455/436, 437, 439, 422.1, 433, 522, 453, 455/63.1, 67.13, 67.11, 570, 452.2; 370/329, 370/331, 332, 342, 335
See application file for complete search history.

(56) References Cited

U.S. PATENT DOCUMENTS

| | | | | |
|---|---|---|---|---|
| 5,566,165 A | * | 10/1996 | Sawahashi et al. | 370/342 |
| 5,590,409 A | * | 12/1996 | Sawahashi et al. | 455/69 |
| 5,649,303 A | | 7/1997 | Hess et al. | |
| 5,825,835 A | * | 10/1998 | Kingston et al. | 375/367 |
| 5,884,175 A | * | 3/1999 | Schiefer et al. | 455/436 |
| 5,898,682 A | * | 4/1999 | Kanai | 370/331 |
| 5,920,590 A | * | 7/1999 | Lomp | 375/146 |
| 5,963,583 A | * | 10/1999 | Davidovici et al. | 375/130 |
| 6,029,074 A | * | 2/2000 | Irvin | 455/571 |
| 6,118,983 A | | 9/2000 | Egusa et al. | |
| 6,167,240 A | * | 12/2000 | Carlsson et al. | 455/67.13 |
| 6,175,586 B1 | * | 1/2001 | Lomp | 375/130 |

(Continued)

FOREIGN PATENT DOCUMENTS

EP        0 687 075 A2    5/1995

(Continued)

OTHER PUBLICATIONS

Tobe, et al., "Autonomous Cell Shaping Method Based on the Arrangement of Base Stations." pp. 520, B-5-70, 2002.

Primary Examiner—Marceau Milord
(74) Attorney, Agent, or Firm—Dickstein, Shapiro, LLP.

(57) ABSTRACT

The radio resource management server 1 receives radio link quality information measured by the radio base station 2 and radio link quality information measured by the radio base station 3 and thus detects the occurrence of interference. Upon the occurrence of the interference, the transmission power of the radio base station causing the occurrence of interference is controllably reduced to suppress the interference. In the method of controllably varying the transmission power of a radio base station, depending on the number of radio terminals or traffic volume, oscillation of a service area occurs. However, according to the present invention, the transmission power is changed on the occurrence of interference, without depending on the number of radio terminals or traffic volume, so that the area oscillation does not occur after the transmission power has been once stabilized.

18 Claims, 21 Drawing Sheets

U.S. PATENT DOCUMENTS

| | | | |
|---|---|---|---|
| 6,226,316 B1 * | 5/2001 | Schilling et al. | 375/142 |
| 6,301,478 B1 | 10/2001 | Wallstedt et al. | |
| 6,334,047 B1 * | 12/2001 | Andersson et al. | 455/69 |
| 6,347,231 B1 * | 2/2002 | Miya | 455/522 |
| 6,370,381 B1 | 4/2002 | Minnick et al. | |
| 6,381,458 B1 * | 4/2002 | Frodigh et al. | 455/442 |
| 6,445,924 B1 * | 9/2002 | Rasanen | 455/437 |
| 6,507,567 B1 * | 1/2003 | Willars | 370/321 |
| 6,522,628 B1 * | 2/2003 | Patel et al. | 370/230.1 |
| 6,529,545 B2 * | 3/2003 | Tiirola et al. | 375/148 |
| 6,556,839 B1 * | 4/2003 | Kondo | 455/522 |
| 6,567,670 B1 * | 5/2003 | Petersson | 455/522 |
| 6,671,512 B2 * | 12/2003 | Laakso | 455/453 |
| 6,721,278 B1 * | 4/2004 | Rimhagen et al. | 370/252 |
| 6,754,254 B2 * | 6/2004 | Sendonaris | 375/148 |
| 6,782,269 B2 * | 8/2004 | Toskala et al. | 455/509 |
| 6,799,045 B1 * | 9/2004 | Brouwer | 455/453 |
| 6,813,256 B1 * | 11/2004 | Nevo et al. | 370/335 |
| 6,868,277 B1 * | 3/2005 | Cerwall et al. | 455/509 |
| 6,871,071 B2 * | 3/2005 | Takao et al. | 455/436 |
| 6,912,228 B1 * | 6/2005 | Dahlman et al. | 370/441 |
| 6,959,048 B1 * | 10/2005 | Horneman et al. | 375/299 |
| 6,965,585 B2 * | 11/2005 | Grilli et al. | 370/331 |
| 7,012,977 B2 * | 3/2006 | Madkour et al. | 375/346 |
| 7,013,160 B2 * | 3/2006 | Tiedemann et al. | 455/522 |
| 7,016,320 B1 * | 3/2006 | Petersson et al. | 370/331 |
| 7,016,686 B2 * | 3/2006 | Spaling et al. | 455/453 |
| 7,035,636 B1 * | 4/2006 | Lim et al. | 455/433 |
| 7,050,760 B2 * | 5/2006 | Itoh | 455/67.13 |
| 7,068,607 B2 * | 6/2006 | Partain et al. | 370/241 |
| 7,117,003 B2 * | 10/2006 | Kayama et al. | 455/522 |
| 7,194,282 B2 * | 3/2007 | Jarvisalo et al. | 455/522 |
| 7,212,533 B2 * | 5/2007 | Gaudillat | 370/395.2 |
| 7,215,653 B2 * | 5/2007 | Kim et al. | 370/329 |
| 7,336,751 B2 * | 2/2008 | Harada et al. | 375/365 |
| 7,349,712 B2 * | 3/2008 | Yoshimura | 455/522 |
| 7,400,645 B2 * | 7/2008 | Tsuchiya et al. | 370/466 |
| 2001/0010686 A1 * | 8/2001 | Kubo et al. | 370/335 |
| 2001/0055459 A1 * | 12/2001 | Yamada et al. | 385/134 |
| 2002/0128031 A1 | 9/2002 | Valkealahti | |

FOREIGN PATENT DOCUMENTS

| | | |
|---|---|---|
| EP | 0 825 741 A2 | 2/1998 |
| EP | 0 841 827 A2 | 5/1998 |
| EP | 0 946 076 A2 | 9/1999 |
| EP | 1 081 979 A1 | 3/2001 |
| EP | 1 128 573 A2 | 8/2001 |
| JP | 9-16335 | 6/1997 |
| JP | 2001-103531 | 4/2001 |
| WO | WO 95/22857 | 8/1995 |
| WO | WO 98/54853 A1 | 12/1998 |
| WO | WO 00/19635 A1 | 4/2000 |
| WO | WO 00/35226 | 6/2000 |

* cited by examiner

FUNCTIONAL BLOCK DIAGRAM OF RADIO BASE STATION

OPERATIONAL FLOWCHART OF AUTONOMOUS TRANSMISSION POWER CONTROL OF RADIO BASE STATION (1)

OPERATIONAL FLOWCHART OF RADIO TERMINAL

OPERATIONAL FLOWCHART OF POWER CONTROL (1)

OPERATIONAL FLOWCHART OF FREQUENCY CONTROL

OTHER OPERATIONAL FLOWCHART OF RADIO TERMINAL

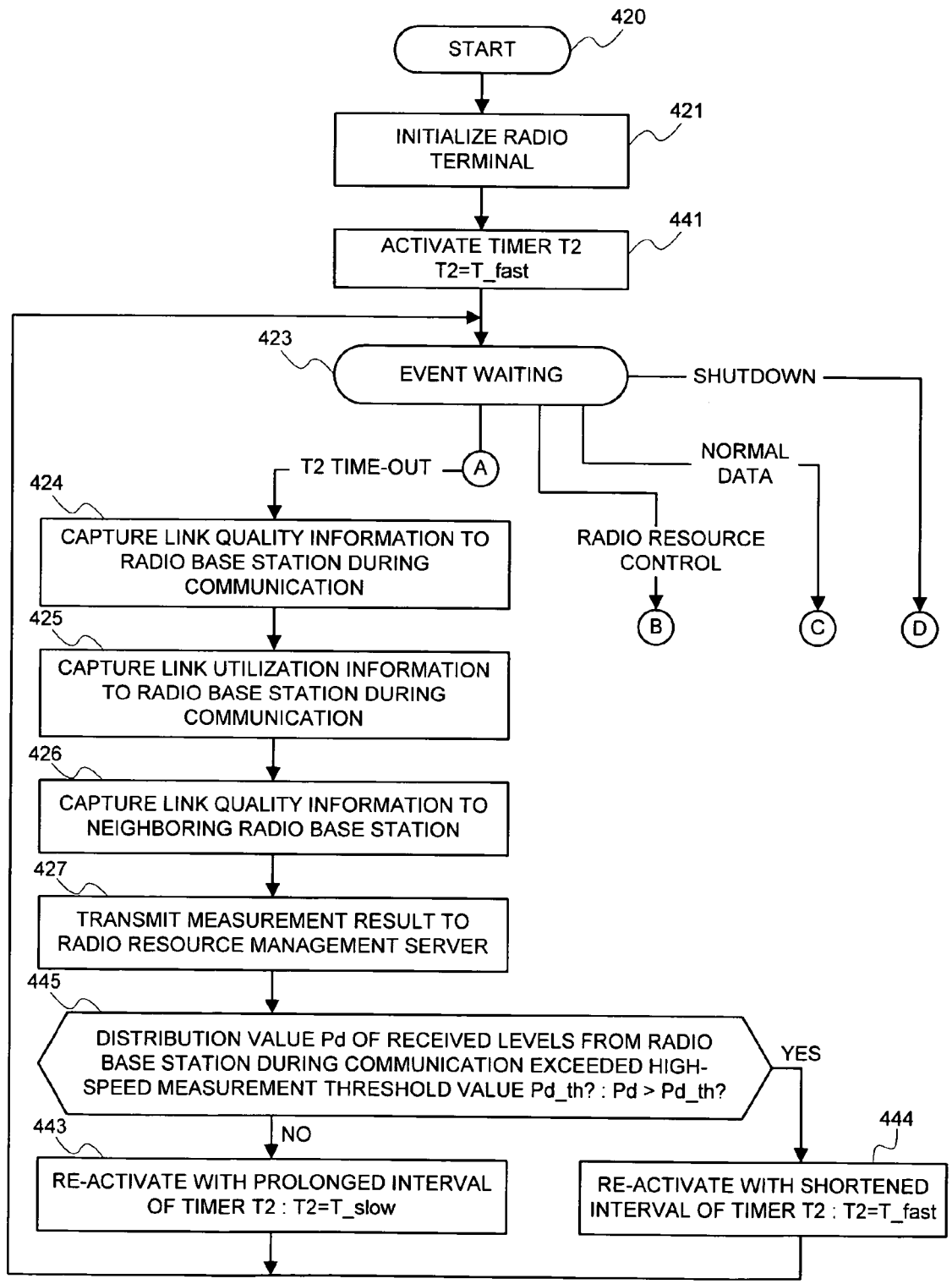

RADIO RESOURCE MANAGEMENT METHOD, MANAGEMENT APPARATUS EMPLOYING THE SAME, BASE STATION, AND TERMINAL

BACKGROUND OF THE INVENTION

The present invention relates to a radio resource management method, management apparatus employing the same, base stations, and terminals. Particularly, the present invention relates to a radio resource management system suitable to public mobile communications of the cellular system or to radio networks such as radio LANs.

In radio networks such as public mobile communications or radio LANs, plural radio base stations, each which has a service area, are installed and data communications and conversation services are provided to radio terminals existing in each of the service areas. In such systems, it is important to manage radio resources. For example, there is the technique of reducing the transmission power of the concerned station when traffic is jammed because of an increased number of radio terminals under command of a radio base station while commanding other neighboring radio base stations to increase the transmission power of a control channel of a local station (refer to patent document 1). According to this technique, the service area of a local station is narrowed while the service area of a neighboring radio base station is expanded. Thus, the radio terminals under the local station are transferred to the neighboring radio base station, so that load distribution is urged.

Furthermore, the radio resource management technique has been proposed that a radio base station autonomously optimizes its transmission power based on both information on location of a neighboring radio base station and measured traffic volumes (refer to non-patent document 1).

Moreover, as the system of managing radio resources in cooperation with a radio base station and radio terminals, the technique has been proposed that a radio base station memorizes link quality statistical information to each radio terminal and preferentially offers other radio base station as a candidate to be transferred (refer to patent document 2).

[Patent Document 1]
JP-P1997-163435A
[Patent Document 2]
JP-P2001-103531A (refer to Pages 2 to 5 and FIG. 1 to FIG. 4)
[Non-Patent Document 1]
"Autonomous cell shaping Method Based on Arrangement of Base stations", written by Tobe et al, in General Meeting of The Institute of Electronics, Information and Communication Engineers of Japan issued in 2002, B-5-70, Pages 520

According to the patent document 1 and the non-patent document 1, there is the disadvantage in that adjusting the size of a service area based on the number of radio terminals and the traffic volume causes oscillation of the area size. Here, the area size oscillation means that the area size expands and contracts repeatedly. Because a radio terminal can move arbitrarily between areas of radio base stations, variations in the number of mobile terminals or in traffic volume occur very often, so that the transmission power is adjusted for each movement. As a result, oscillation of the area size occurs and makes it difficult to effectively control the radio resources.

In the system according to the patent document 2, the radio resources are managed in cooperation with radio base stations and radio terminals. For that reason, both the radio base station and the radio terminal require hardware and software additionally modified for radio resource control. Hence, the problem is that the radio resources cannot be effectively managed.

SUMMARY OF THE INVENTION

An object of the present invention is to provide a radio resource management system capable of managing radio resources effectively and stably, with no oscillation of the area size.

Another object of the present invention is to provide a radio resource management system capable of effectively managing radio resources based on radio resource quality information obtained from a radio terminal, without the hardware and the software additionally amended in a radio base station.

According to the present invention, a radio resource management method comprises the control step of controlling transmission power of a radio base station for interference suppression in response to occurrence of interference between service areas provided by plural radio base stations.

According to the present invention, a radio resource management apparatus comprises control means for controlling transmission power of a radio base station for interference suppression in response to occurrence of interference between service areas provided by plural radio base stations.

According to the present invention, a radio base station in a radio communication system, the radio communication system including plural radio base stations each which provides a service area and a radio resource management apparatus for managing radio resources of the radio base stations, comprises means for measuring a radio link quality and then notifying a radio resource management apparatus of radio link quality information being a measurement result; and means for responding transmission power control issued from the radio resource management apparatus and then controllably changing transmission power, to suppress interference between service areas detected based on the measurement result in the radio resource management apparatus.

In another aspect of the present invention, a radio resource management method comprises the step of responding occurrence of interference between service areas provided by plural radio base stations; and controlling its transmission power to suppress the interference autonomously by each of the plural radio base stations.

In another aspect of the present invention, a radio base station comprises control means for controlling transmission power to suppress interference autonomously in response to occurrence of interference between plural service areas.

In another aspect of the present invention, a radio resource management method comprises the control step of distributively controlling a load, being a radio terminal accommodated in a radio base station, based on information on radio link qualities notified from plural radio terminals.

In another aspect of the present invention, a radio resource management apparatus comprises means for distributively controlling a load, being a radio terminal accommodated in a radio base station, based on information on radio link qualities notified from plural radio terminals.

In another aspect of the present invention, a radio resource management method comprises the control step of controlling transmission power of a radio base station based on information on radio link qualities notified from plural radio terminals.

In further another aspect of the present invention, a radio resource management apparatus comprises control means for controlling transmission power of a radio base station based on information on radio link qualities notified from plural radio terminals.

In another aspect of the present invention, a radio resource management method comprises the control step for controllably changing a frequency used by a radio base station based on information on radio link qualities notified from plural radio terminals.

In another aspect of the present invention, a radio resource management apparatus comprises control means for controllably changing a frequency used by a radio base station based on information on radio link qualities notified from plural radio terminals.

According to the present invention, a radio terminal comprises means for measuring a radio link quality and then notifying a radio resource management apparatus of radio link quality information being the measurement result; and means for responding distributed control indication for a load being a radio terminal accommodated in a radio base station, based on the radio link quality information, the distributed control indication being created from the radio resource management apparatus, and switching a radio base station to be connected.

According to the present invention, a computer readable program, that operably controls a radio resource management apparatus in a radio communication system, comprises the control step of responding occurrence of interference between service areas provided by plural radio base stations and then controlling the transmission power of a radio base station to suppress the interference.

In another aspect of the present invention, a computer readable program, that operably controls a radio resource management apparatus in a radio communication system, comprises a control step of distributively controlling a load, being a radio terminal accommodated by a radio base station, based on information on radio link qualities notified from plural radio terminals.

In another aspect of the present invention, a computer readable program, that operably controls a radio resource management apparatus in a radio communication system, comprises a control step of controlling transmission power of a radio base station, based on information on radio link qualities notified from plural radio terminals.

In another aspect of the present invention, a computer readable program, that operably controls a radio resource management apparatus in a radio communication system, comprises a control step of controllably changing a frequency used by a radio base station, based on information on radio link qualities notified from plural radio terminals.

In another aspect of the present invention, a computer readable program, that operably controls a radio base station in a radio communication system, the radio communication system including plural radio base stations each providing a service area and a radio resource management apparatus for managing radio resources of the radio base stations, comprises the steps of measuring a radio link quality and then notifying the radio resource management apparatus of radio link quality information being a measurement result; and responding transmission power control produced from the radio resource management apparatus and thus controlling a change of transmission power, to suppress interference between service areas detected based on the measurement result in the radio resource management apparatus.

In another aspect of the present invention, a computer readable program, that computer controls the operation of a radio base station in a radio communication system, the radio communication system including plural radio base stations each providing a service area and a radio resource management apparatus for managing radio resources of the radio base stations, comprises the control step of responding occurrence of interference between plural service areas and controlling transmission power, to suppress interference autonomously.

In another aspect of the present invention, a computer readable program for executing the operation of a radio resource management apparatus in a radio communication system, by means of a computer, comprises the control step of distributively controlling a load, being a radio terminal accommodated in a radio base station, based on information on radio link qualities notified from plural radio terminals.

In another aspect of the present invention, a computer readable program for executing a radio resource management apparatus in a radio communication system, by means of a computer, comprises the control step of controlling transmission power of a radio base station based on information on radio link qualities notified from plural radio terminals.

In another aspect of the present invention, a computer readable program for executing a radio resource management apparatus in a radio communication system, by means of a computer, comprises the control step of controllably changing a frequency used by a radio base station based on information on radio link qualities notified from plural radio terminals.

In another aspect of the present invention, a computer readable program for executing the operation of a radio terminal by means of a computer, comprises the steps of measuring a radio link quality and notifying a radio resource management apparatus of the radio link quality information being the measurement result; and responding a distributed control indication of a load based on the radio link quality information, the distributed control being created from the radio resource management apparatus, the load being a radio terminal accommodated in a radio base station, and thus switching a radio base station to be connected.

BRIEF DESCRIPTION OF THE DRAWINGS

This and other objects, features and advantages of the present invention will become more apparent upon a reading of the following detailed description and drawings, in which:

FIG. 21 is an operational flowchart for a radio terminal according to a seventh embodiment of the present invention.

DESCRIPTION OF THE EMBODIMENTS

Figure 1:
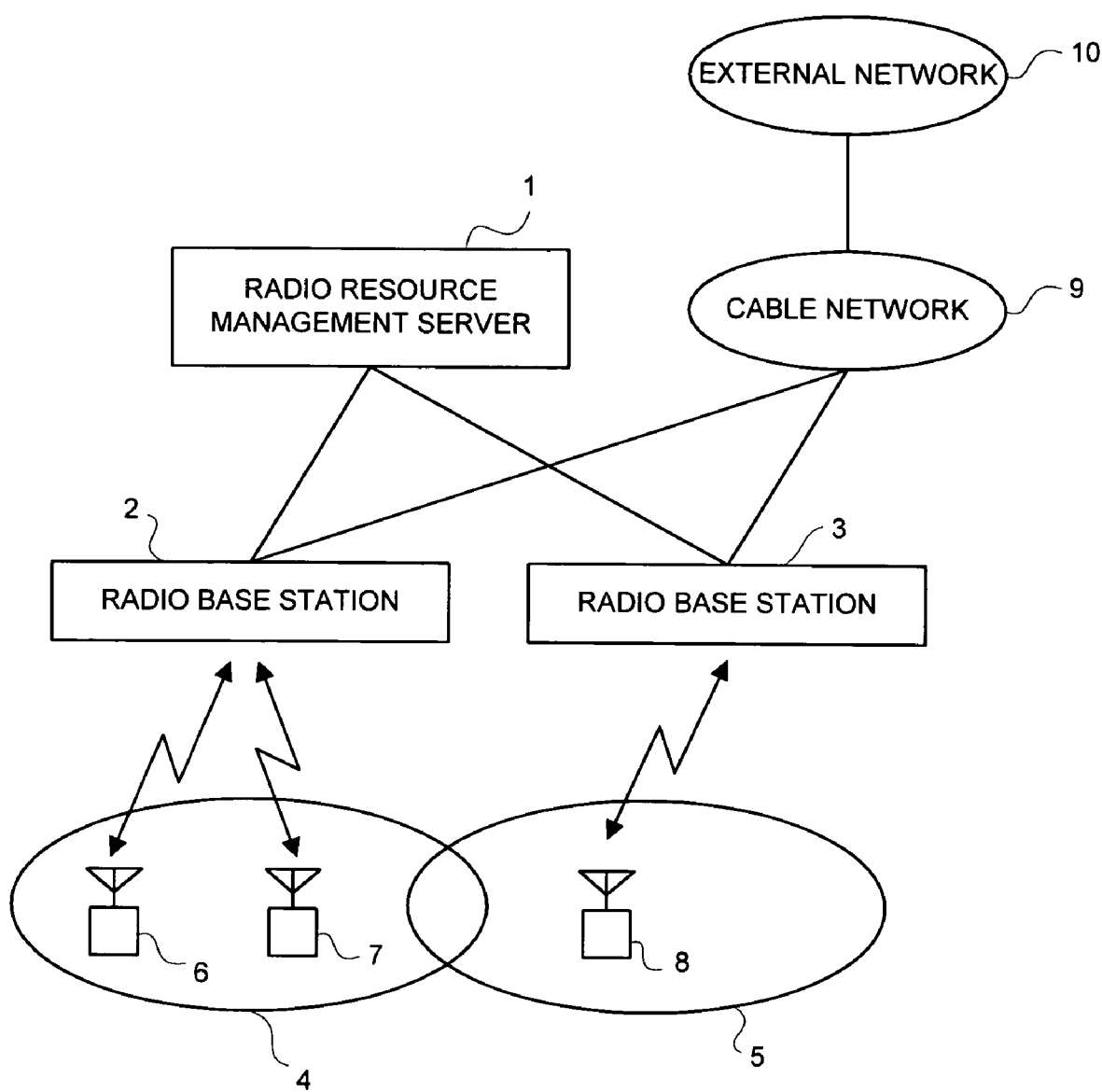
FIG. 1 is a block diagram schematically illustrating a radio resource management system according to a first embodiment of the present invention.

Embodiments of the present invention will be explained below in detail by referring to the attached drawings. FIG. 1 is a schematic diagram illustrating the outline of a system to which a first embodiment of the present invention is applied. A radio resource management server 1 manages radio resources in the radio communication system. The radio resource management server 1 includes as followers radio base stations 2 and 3, which include service areas 4 and 5, respectively. For example, as shown in FIG. 1, the service area 4 includes radio terminals 6 and 7 while the service area 5 includes a radio terminal 8. The radio base stations 2 and 3 are connected to an external network 10 via a cable network 9.

Figure 2:
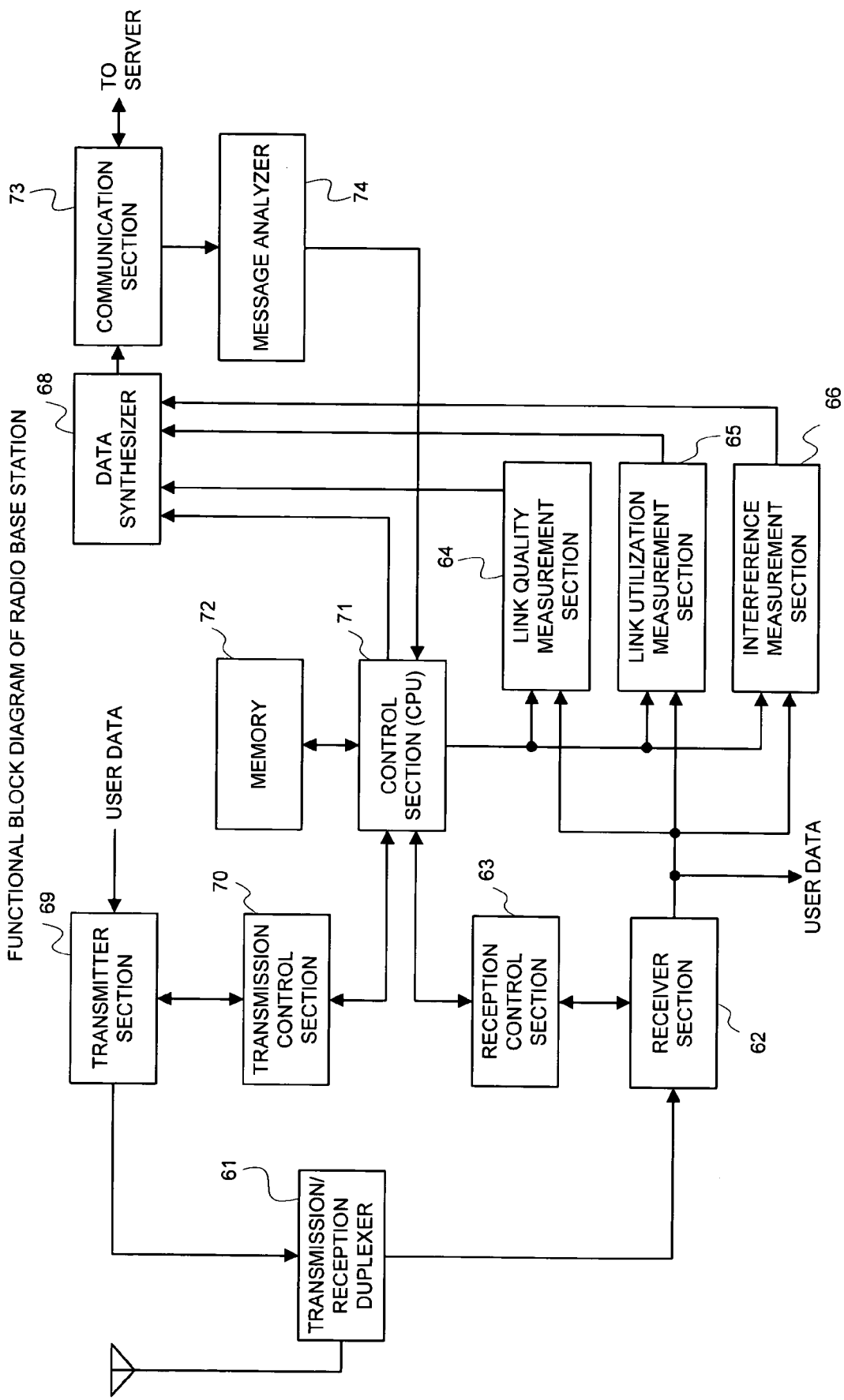
FIG. 2 is a functional block diagram schematically illustrating a radio base station according to the present invention.

FIG. 2 is a schematic block diagram illustrating the function of a radio base station. A transmitter section 69 performs a transmission process of downstream user data (or packet data) and transmits the processed data to a radio terminal via a transmission/reception duplexer 61 and an antenna. The transmission/reception duplexer 61 sends radio waves received by the antenna to a receiver section 62, thus deriving upstream user data and various control information including pilot signals, and the like. According to the user data and the control information, a link quality measurement section 64 measures the quality of a radio link while a link utilization measurement section 65 measures the utilization of a radio link. An interference amount measurement section 66 decides a neighboring radio base station to be notified the radio resource management server and measures information on the neighboring radio base station decided. As one example of the deciding method, there is the method (to be described later) for deciding a neighboring radio base station based on the received level of radio waves therefrom.

A data synthesizer 68 synthesizes results measured by the link quality measurement section 64, the link utilization measurement section 65, and the interference amount measurement section 66. Thus, the data synthesizer 68 notifies the radio resource management server of the synthesized result acting as the radio link measurement information 600 via the communication section 73. The message analyzer 74 analyzes various messages from the radio resource management server obtained via the communication section 73 and supplies the analysis result to the control section 71 or CPU. The control section 71 controls the reception control section 63 and the transmission control section 70 in accordance with the analysis result and implements frequency change control and transmission power control, and the like (to be described later). The memory 72, which is a working memory for the CPU, stores an operational control program.

Figure 3:
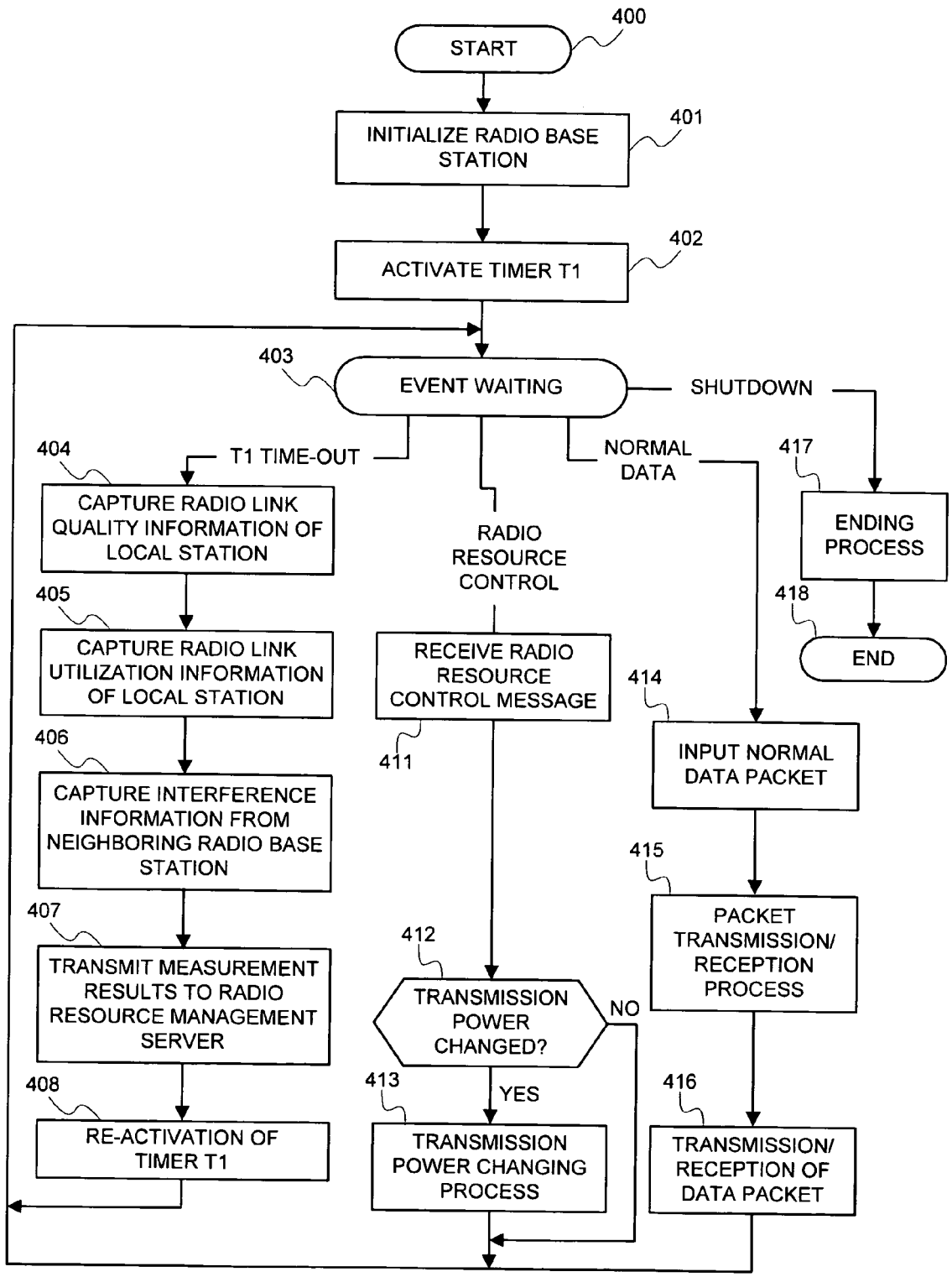
FIG. 3 is an operational flowchart for the radio base station according to the first embodiment of the present invention.

FIG. 3 is an operational flowchart for a radio base station according to the first embodiment of the present invention. First, a radio base station is initialized after booting, captures information including frequency channel, transmission power, the address of the radio base station, or the address of a radio resource management server, and performs various configurations (steps 400 and 401).

Next, the radio base station activates the timer T1 (step 402) and becomes an event-waiting state (step 403). The timer T1 indicates the time interval during which a radio base station notifies a radio resource management server of a radio link measurement result. The interval is a variable value settable for each radio base station. The radio base station captures, every timeout of the timer T1, radio link quality information of the base radio station (step 404), radio link utilization information (step 405), and interference information from a neighboring radio base station to be notified the radio resource management server (step 406). Thereafter, the radio base station transmits the measured result to the radio resource management server (step 407). The radio base station goes back to the event-waiting state after the timer T1 re-activates.

Next, when the radio base station receives a radio resource control message from the radio resource management server (step 411), the transmission power is changed to a specified value (step 413) if the control content is a transmission power change request (step 412). Normally, the data transfer process is independent of these control messages. A packet transfer process is carried out between a cable link and a radio link or between a radio link and a cable link (steps 414 to 416). When the radio base station is shutdown, the process is completed after an ending procedure (steps 417 to 418).

Figure 4:
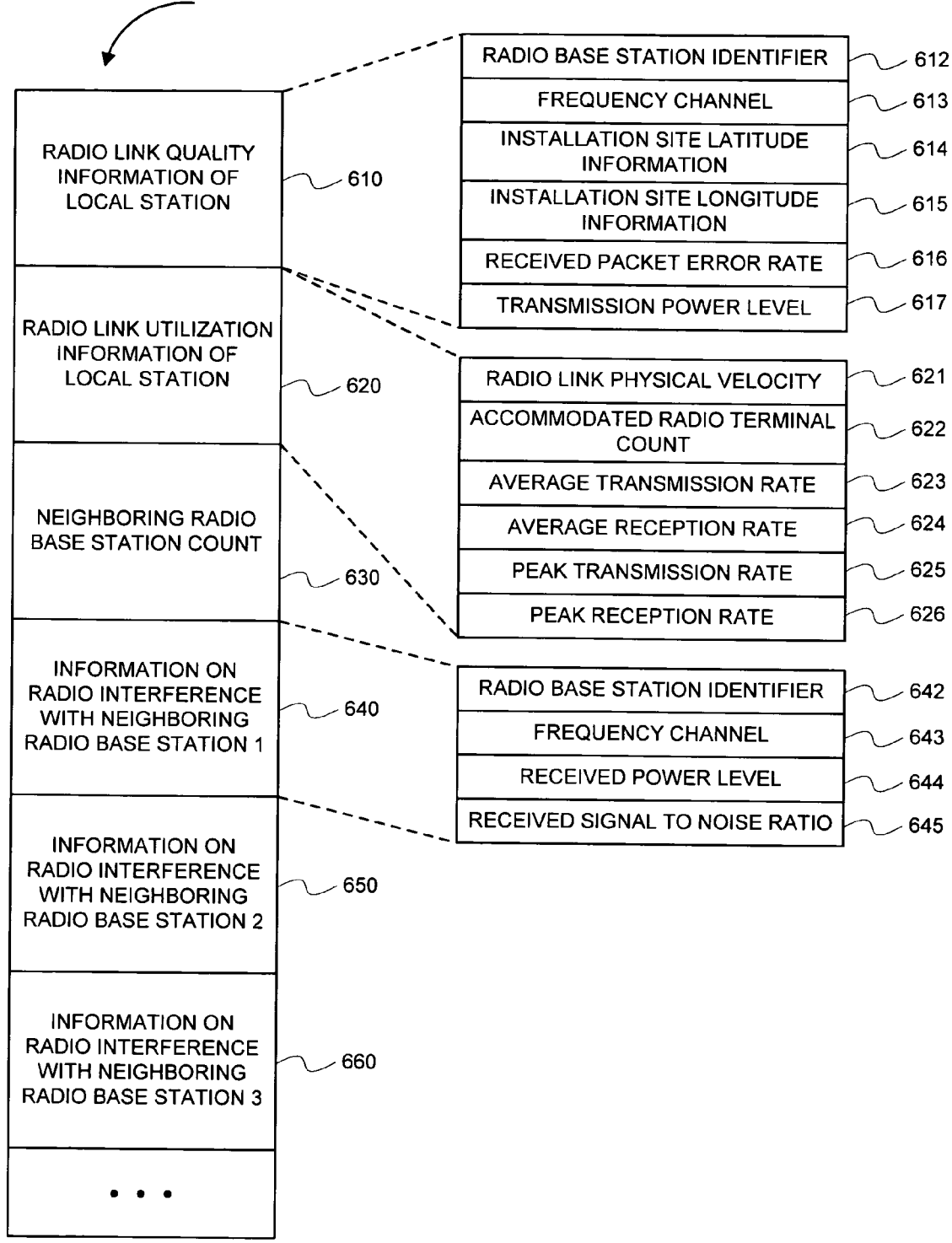
FIG. 4 is a diagram showing the content of radio link measurement information to be transmitted from the radio base station to a radio resource management server, according to the first embodiment of the present invention.

FIG. 4 shows the content of the radio link measurement information 600 transmitted from the radio base station to the radio resource management server, according to the first embodiment of the present invention. The radio link measurement information 600 consists of radio link quality information 610 of a local station, radio link utilization information 620 of a local station, the number of neighboring radio base stations 630, and sets of radio interference information 640, 650, 660, ... to neighboring radio base stations 1, 2, 3, ..., respectively. The radio link quality information, the radio link utilization information, and the radio interference information may be comprehensively referred to as radio link quality information. In other words, a large radio link utilization causes congestion, thus deteriorating the communication quality. Hence, the radio link utilization may be said to be quality information. Moreover, the interference information may be said to be quality information.

The radio link quality information 610 of a local station includes a radio base station identifier 612, a frequency channel 613, installation site latitude information 614, installation site longitude information 615, a received packet error rate 616, and a transmission power level 617. For example, in the case of the radio LAN, a MAC (Media Access Control) address of a radio base station is used to the radio base station identifier. The frequency channel 613 is represented with a channel number allocated for each radio system or the frequency thereof is represented in kHz unit.

The latitude information and the longitude information of an installation spot are used only when the radio base stations use them. The Global Positioning System (GPS), PHS system, or similar systems may be considered as means for capturing the latitude information and the longitude information. Alternatively, a base station builder may be measured manually them. The received packet error rate 616 indicates the ratio of packets in a CRC (Cyclic Redundancy Check) error to packets received from following radio terminals for a measuring period. The transmission power level transmitted from a radio base station to radio terminals is shown in dBm unit.

In the local station, the radio link utilization information 620 includes a radio link physical velocity 621, an accommodated radio terminal count 622, an average transmission rate 623, an average reception rate 624, a peak transmission rate 625, and a peak reception rate 626. The accommodated radio terminal count 622 represents the number of radio terminals connected under command of the corresponding radio base station. Each of the average transmission rate 623 and the average reception rate 624 is an average bit rate (or the number of bits transmitted/received via the radio link for a measuring interval/the measuring interval). Each of the peak transmission rate 625 and the peak reception rate 626 represents a maximum number of bits transmitted/received for one second during a measuring interval.

The number 630 of neighboring radio base stations represents the number included in the radio link measurement information 600 of other radio base stations detectable by the corresponding radio base station. That is, the other radio base station from which radio waves are received with a level more than a predetermined threshold value is defined as "other radio base station which can be detected by the corresponding base station". "the number included in the radio link measurement information 600" means the number of radio base stations of which the received level is more than a second threshold value that is set to a higher value exceeding the threshold value of the received level in the corresponding radio base station. Only information on other radio base station possibly interfering with the local station is transmitted to the radio resource management server. Thus, the traffic volume is alleviated and congestion of the network is prevented.

It is not absolutely needed that the radio base station notifies the radio resource management server of all sets of detected information regarding other base stations. The information 640 on radio interference with the neighboring radio base station 1 includes the radio base station identifier 642, the frequency channel 643, the received power level 644, and the received signal to noise ratio 645. The meaning of them has been explained together with the radio link quality information 610 of the local station. Actually, the interference amount from other radio base station is obtained based on the sum of received power levels from other base stations in the same frequency channel as that of the local station.

Figure 5:
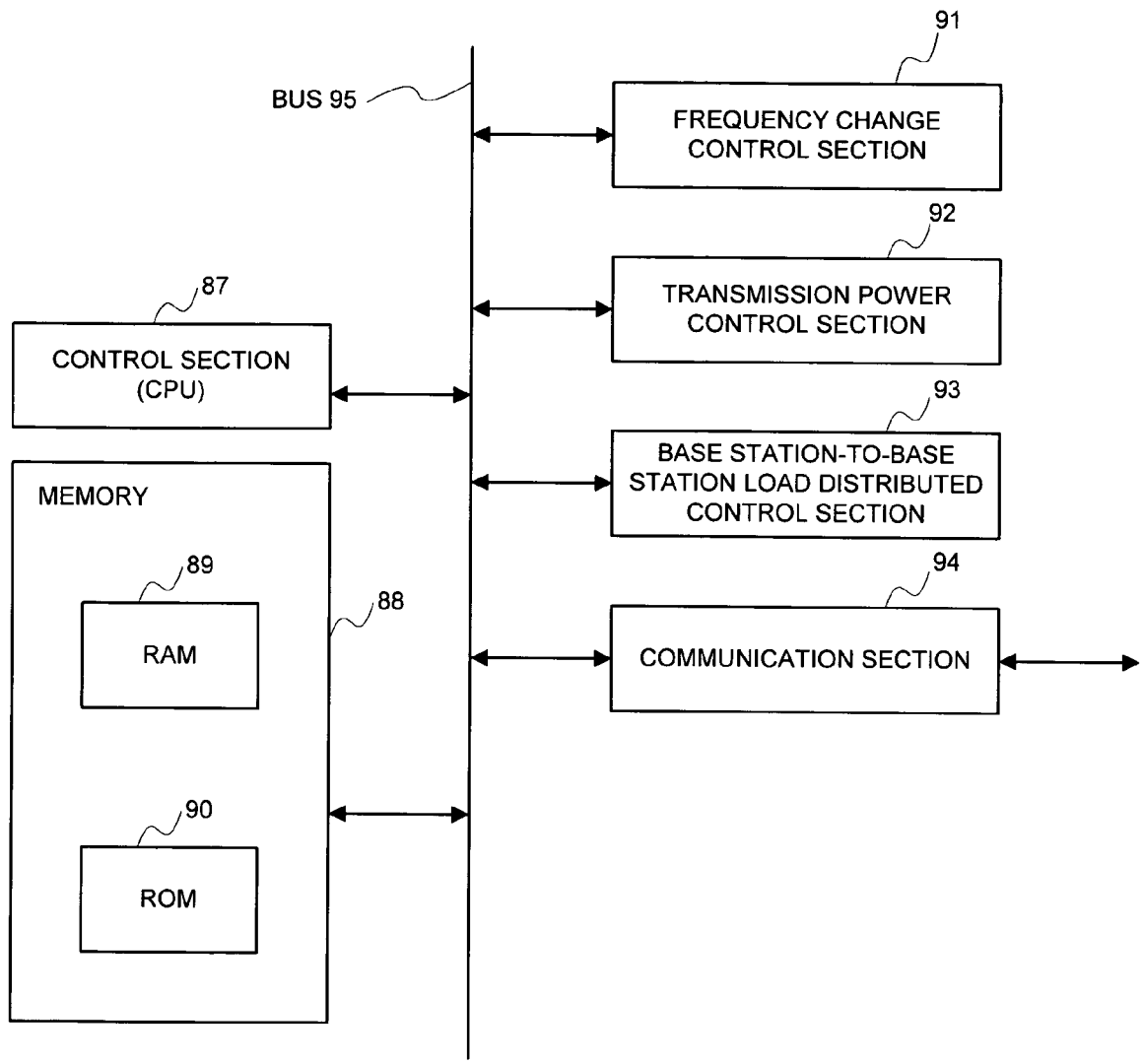
FIG. 5 is a functional block diagram schematically illustrating a radio resource management server according to the present invention.

Next, the radio resource management server will be explained here. FIG. 5 is a schematic block diagram showing the function of a radio resource management server. The control section 87 is a CPU that controls various portions in accordance with a program stored in the ROM 90 within the memory 88. The memory 88 includes the RAM 89 and the ROM 90, each being a working memory for the CPU 87. The frequency-change control section 91 controllably changes the frequency channel to a radio base station. The transmission-power control section 92 controls the transmission power to a radio base station. The base station-to-base station load distributed control section 93 distributively controls the load between radio base stations. The communication section 94 communicates with radio base stations and radio terminals. These elements are connected in conjunction with the bus 95.

Figure 6:
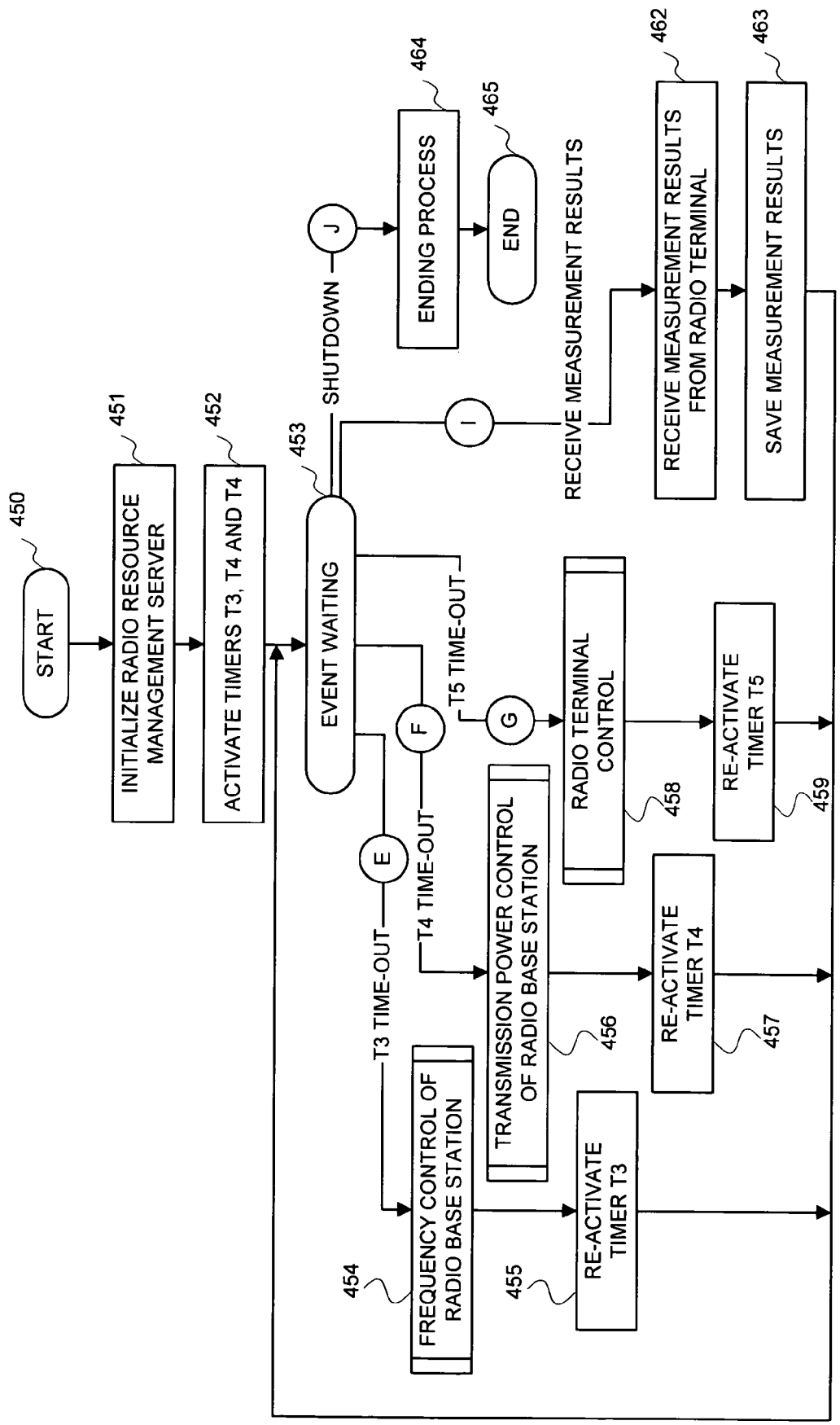
FIG. 6 is a flowchart for the operation of the radio resource management server shown in FIG. 5.

FIG. 6 is an operational flowchart for a radio resource management server according to the present invention. The operation of the flowchart is applied to all the following embodiments. The radio resource management server is initialized (step 451) and then activates three timers T3, T4 and T5 (step 452). Thereafter, the radio resource management server becomes an event-waiting state (step 453). The timer T3 specifies the interval at which the frequency channel of a radio base station is controllably changed (step 454). The timer T4 specifies the interval at which the transmission power of a radio base station is controllably changed (step 456). The timer T5 specifies the interval at which a radio terminal is controlled (step 458). These processes are performed respectively after the timeout of the timers T3 to T5.

In addition, when measured information is received from a radio terminal (step 462), the measured result is preserved. When shutdown is initiated, the ending process (step 464) is performed.

Figure 7:
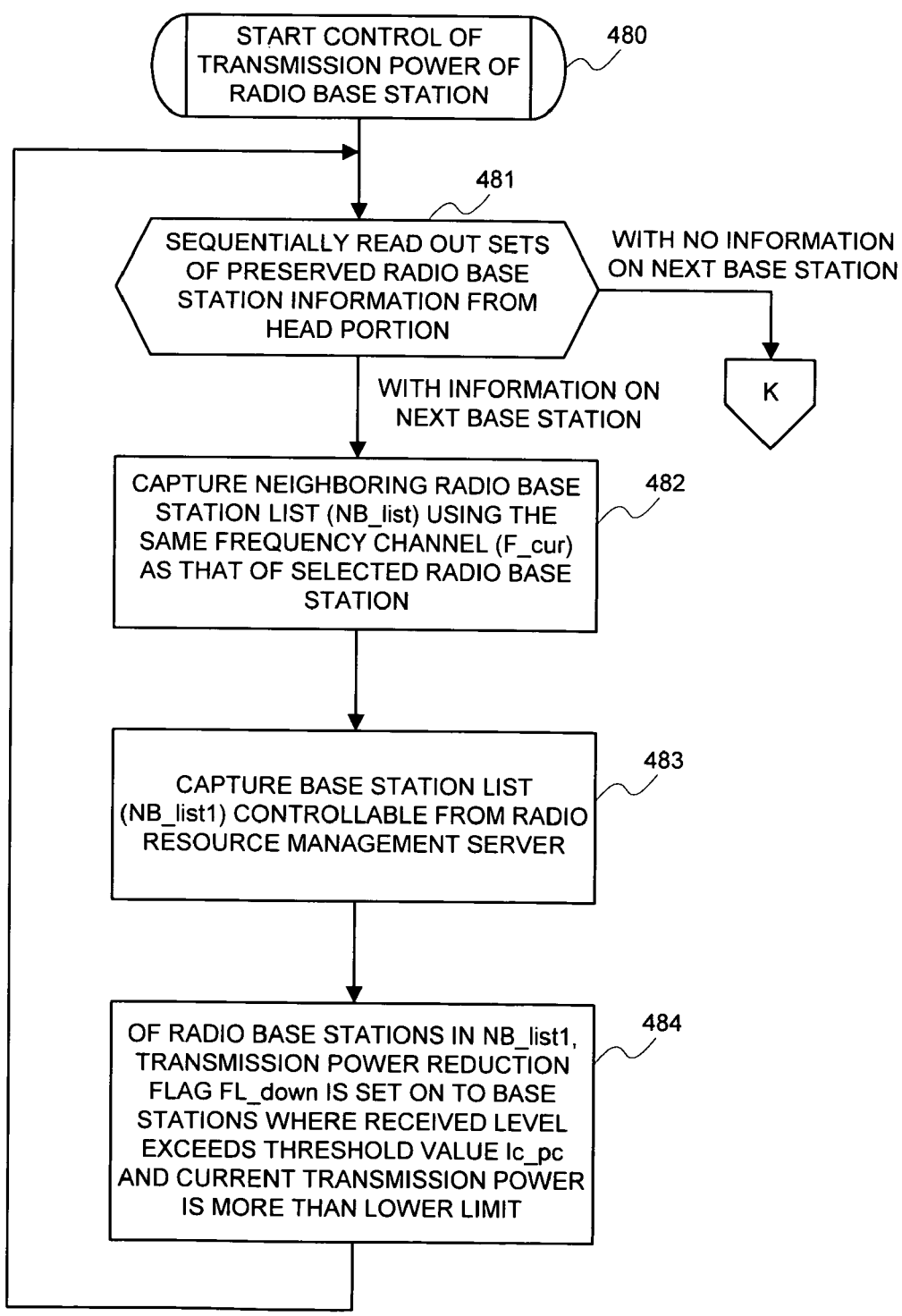
FIG. 7 is a flowchart partially showing the operation of the radio resource management server according to the first embodiment of the present invention.
Figure 8:
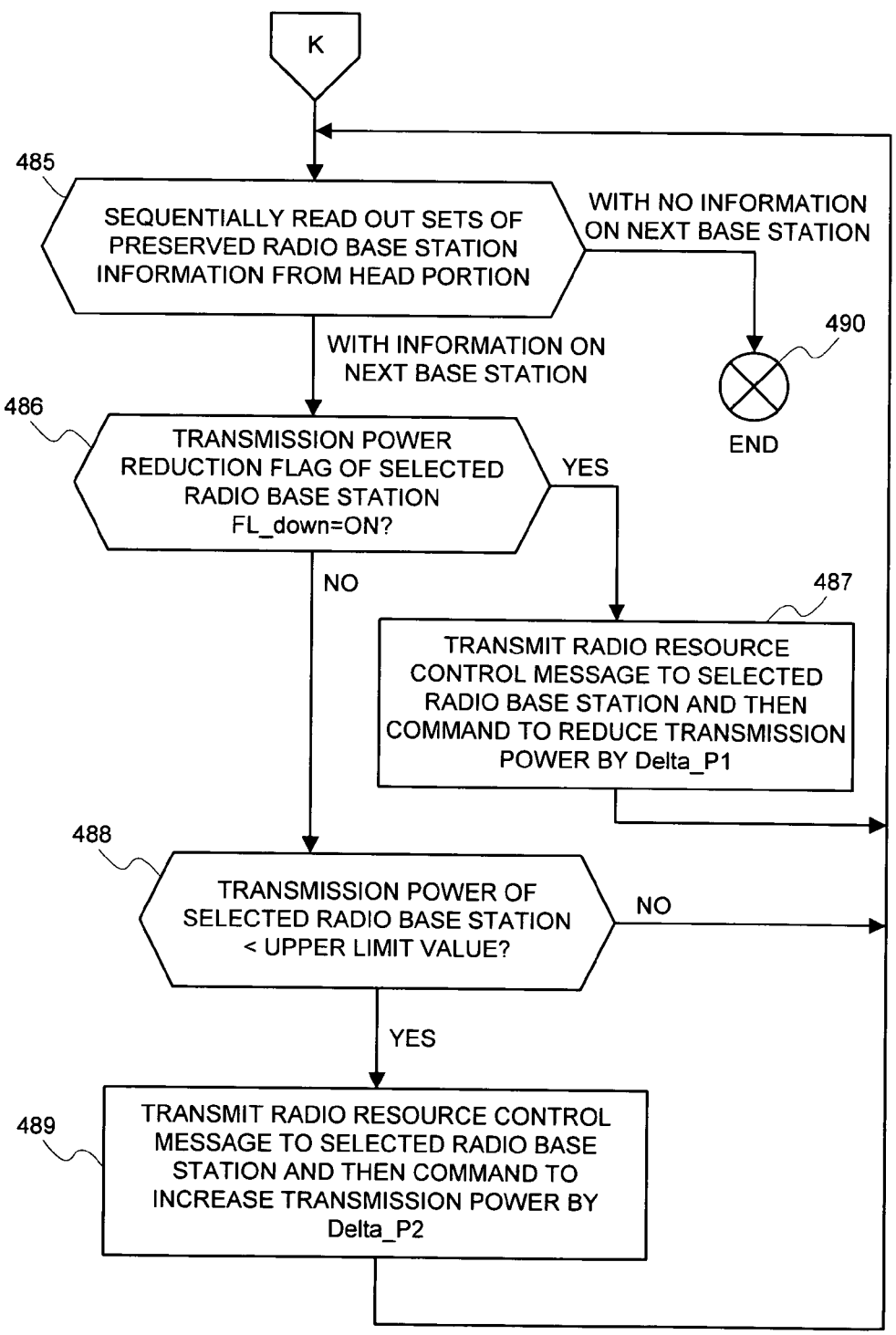
FIG. 8 is a flowchart partially showing the operation of the radio resource management server according to the first embodiment of the present invention.

FIGS. 7 and 8 are operational flowcharts of the case where the radio resource management server controls the power of a radio base station on generation of interference between service areas (that is, on interference detection), according to the first embodiment of the present invention. Sets of radio base station information are read out sequentially from the head portion every radio base station (step 481). Next, the radio base station list (NB_list), in which a group of neighboring radio base stations using the same frequency channel (F_cur) as that of a selected base station (a local station) is listed, is captured (step 482). Of the radio base stations, the list (NB_list1) representing a group of radio base stations controllable from the radio resource management server is captured (step 483).

Figure 9:
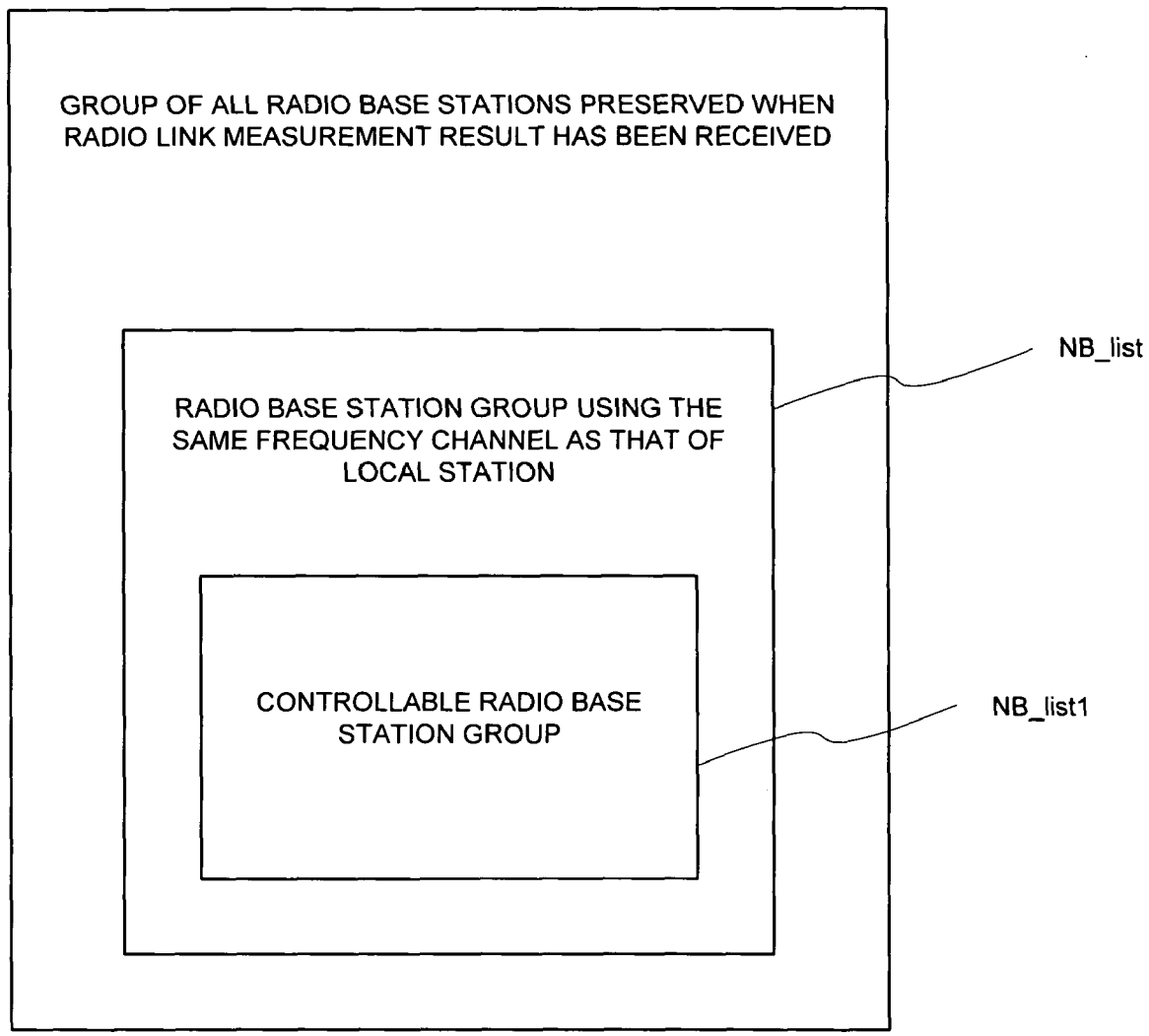
FIG. 9 is a diagram showing the relationship between the radio base station list (NB_list) shown in FIG. 7 and the radio base station list (NB_list1) shown in FIG. 8.

The list is limited to a group of radio base stations controllable from the radio resource management server. The reason is that because the server receives and saves radio link measured results from all radio base stations, including radio base stations uncontrollable by the server, it is needed to use only the results measured radio base stations controllable by the server. FIG. 9 shows the relationship between the radio base station lists (NB_list) and (NB_list1).

The transmission power reduction flag FL_down is made ON to the base station of which a received level exceeds a threshold value Ic_pc and a current transmission power is more than a lower limit value of the radio base stations included in the radio base station list (NB_list1). Thus, the interference amount is reduced controllably (step 484).

All radio base stations from which the received level of other radio base station exceeds a threshold value are listed up and then the step moves to an actual transmission power control (FIG. 8). Sets of radio base station information saved are sequentially read out from the head portion every base station (step 485). If the transmission power reduction flag FL_down of a selected radio base station is ON (step 486), the radio resource management server transmits a radio resource message to the selected radio base station, thus commanding to reduce the transmission power by Delta_P1 (step 487).

With FL_down being in an off state in the step 486, if the transmission power of a selected radio base station is less than an upper limit value (step 488), the radio resource management server transmits a radio resource control message to the selected radio base station. Thus, the radio resource management server commands to increase the transmission power by Delta_P2 (step 489). As described above, boosting the transmission power as higher as possible so long as interference does not occur leads to spreading the network cover area of the radio business owner.

Figure 10:
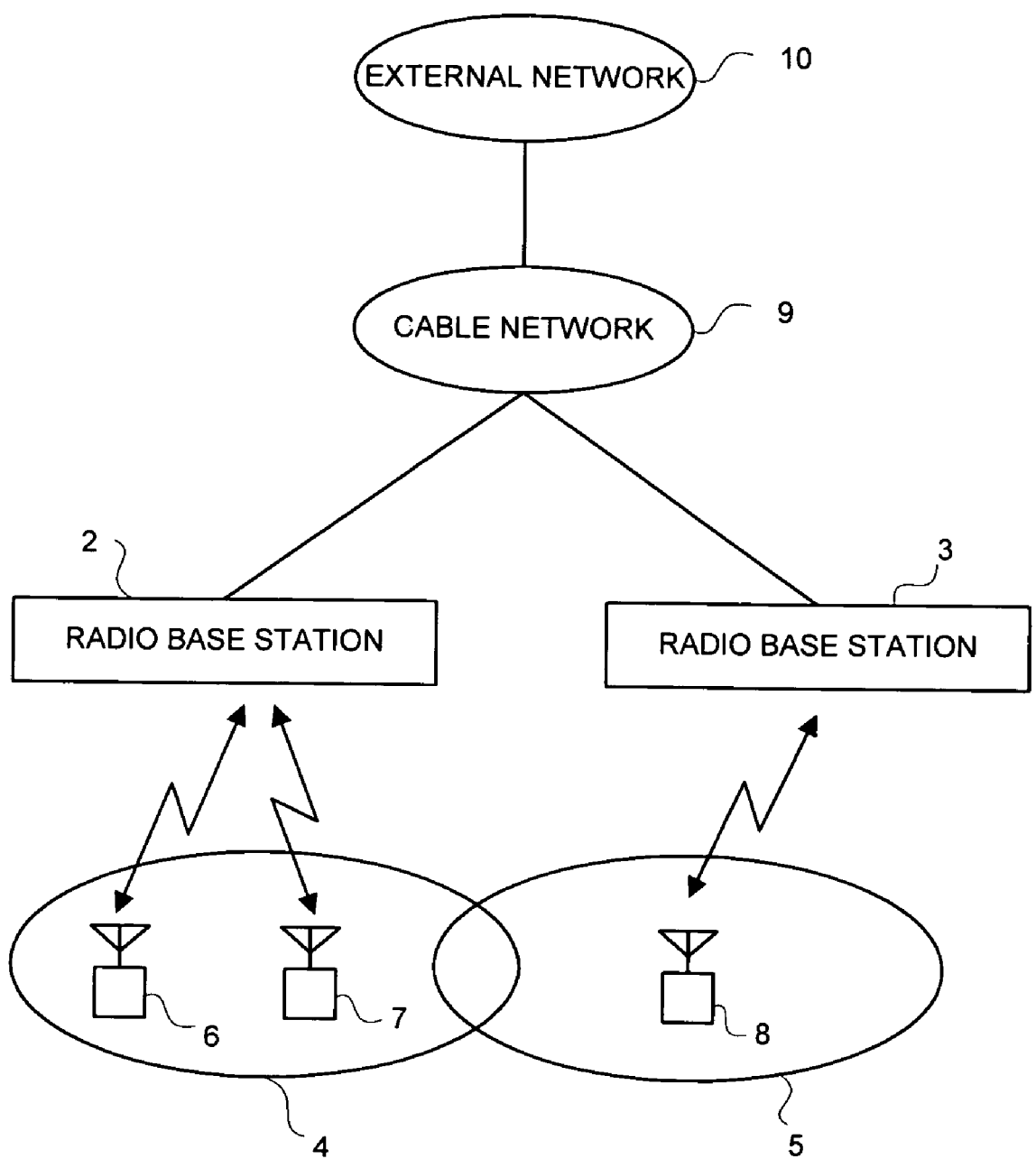
FIG. 10 is a schematic diagram illustrating an outline system according to a second embodiment of the present invention.

In the above-mentioned first embodiment, a radio resource management server controls the transmission power of a radio base station on generation of interference so that generation of interference is prevented. In the second embodiment described below, each radio base station autonomously controls the transmission power to prevent generation of interference. FIG. 10 is a block diagram illustrating the outline of the system according to the embodiment. Referring to FIG. 10, like numerals are attached to the same constituent elements as those in FIG. 1. In FIG. 10, the radio resource management server 1 is omitted shown in FIG. 1 because each radio base station autonomously controls the transmission power.

Figure 11:
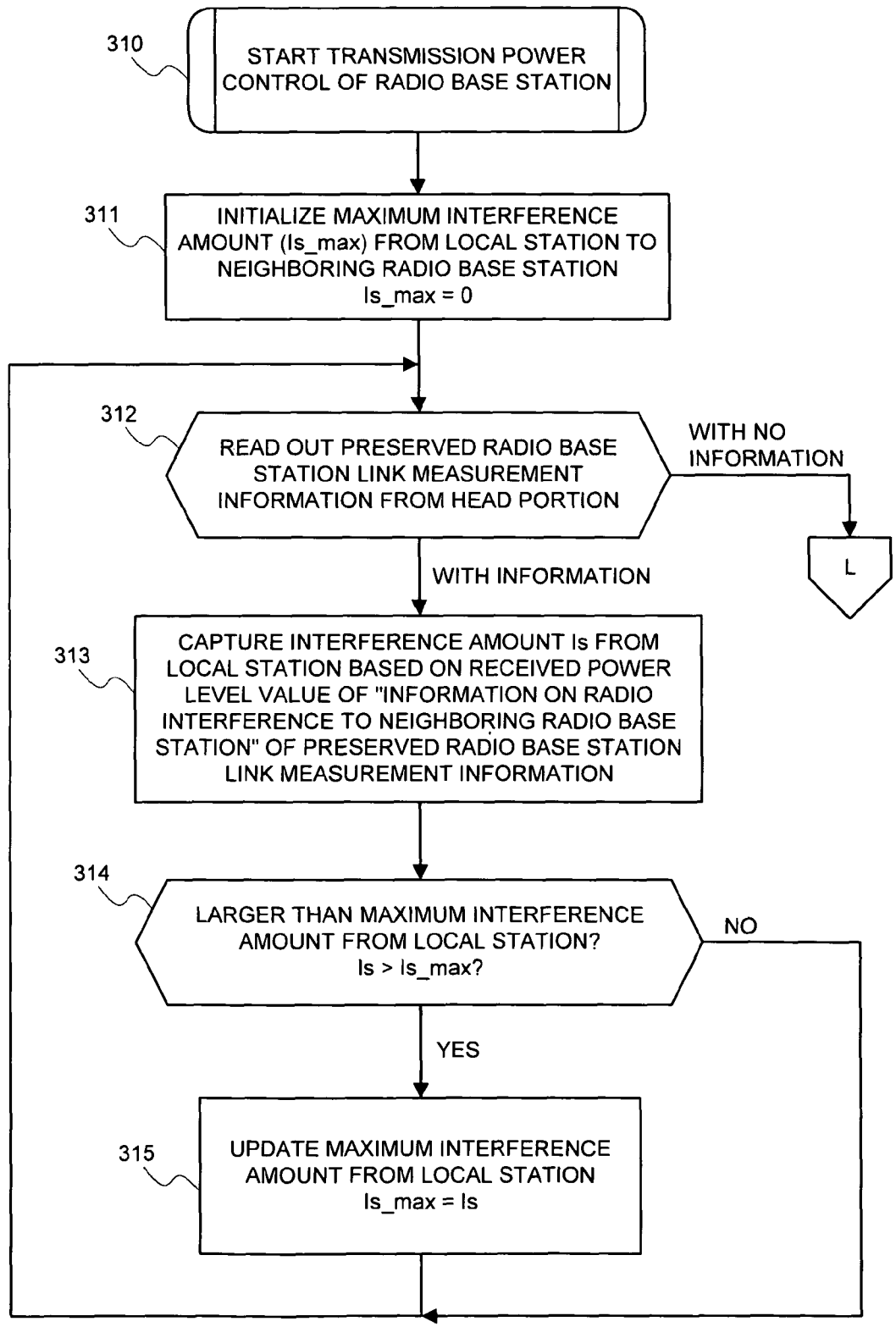
FIG. 11 is a diagram partially showing the operational flow of a radio base station according to the second embodiment of the present invention.
Figure 12:
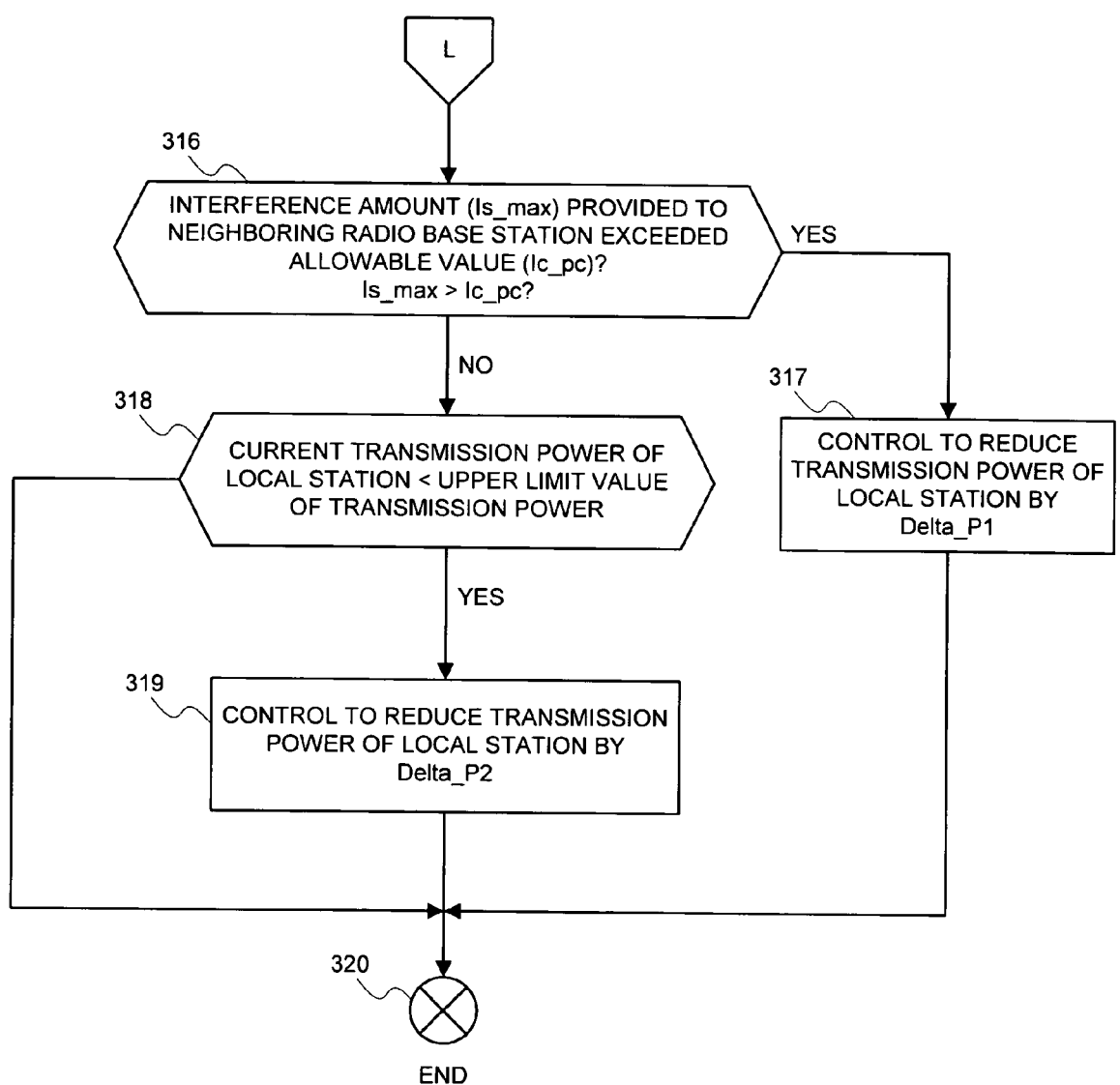
FIG. 12 is a diagram partially showing the operational flow of a radio base station according to the second embodiment of the present invention.

Each of FIGS. 11 and 12 is an operational flowchart for the second embodiment according to the present invention. It is now assumed that respective radio base stations communicate (or broadcast) the radio link measurement information shown in FIG. 4 mutually to other neighboring radio base stations and save radio link measurement information notified from other station. First, the maximum interference amount Is_max from the local station to a neighboring radio base station is initialized to "0" (step 311). Then, the radio base station link measurement information saved is read out (step 312). Thus, the interference amount is from the local station is captured based on the received power level value in "information on a radio interference with a neighboring radio base station" (step 313).

It is decided whether or not the interference amount from the local station is at maximum. Decision is made by comparing the interference amount Is from the local station with the maximum interference amount Is_max (step 314). When the interference amount Is from the local station exceeds the maximum interference amount Is_max, Is_max is updated to Is (step 315). Then, the link measurement information of the next radio base station is read out. When the above-mentioned process is completed over all sets of information, it is decided whether or not the interference amount (Is_max) provided to a neighboring radio base station exceeds an allowable value Ic_pc (or a predetermined threshold value) (step 316). If the interference amount (Is_max) exceeds the allowable value Ic_pc, the transmission power is controlled to decrease by Delta_P1 (step 317). If not so, the current transmission power of the local station is compared with the transmission power upper limit value (step 318). If the current transmission power is more than the upper limit value, the transmission power of the local station is controlled to increase by Delta_P2 (step 319).

In the first and second embodiments, interference is suppressed by controlling the transmission power of a radio base station upon generation of interference, instead of adjusting the service area size based on the number of radio base stations and the traffic volume. Accordingly, when the transmission power is once stabilized, the radio resources can be managed stably and effectively, with no occurrence of oscillation of a service area.

The system of controlling the transmission power of a radio base station based on radio link quality information measured by a radio base station has been described in the above-mentioned embodiment. However, the radio base station must have the measuring function to obtain radio link quality information. This requires hardware or software to be added or modified to the radio base station. In order to overcome such problems, the following embodiment is shown below, that effectively manages radio resources based on the radio link quality information from a radio terminal without any addition or modification to a radio base station.

Figure 13:
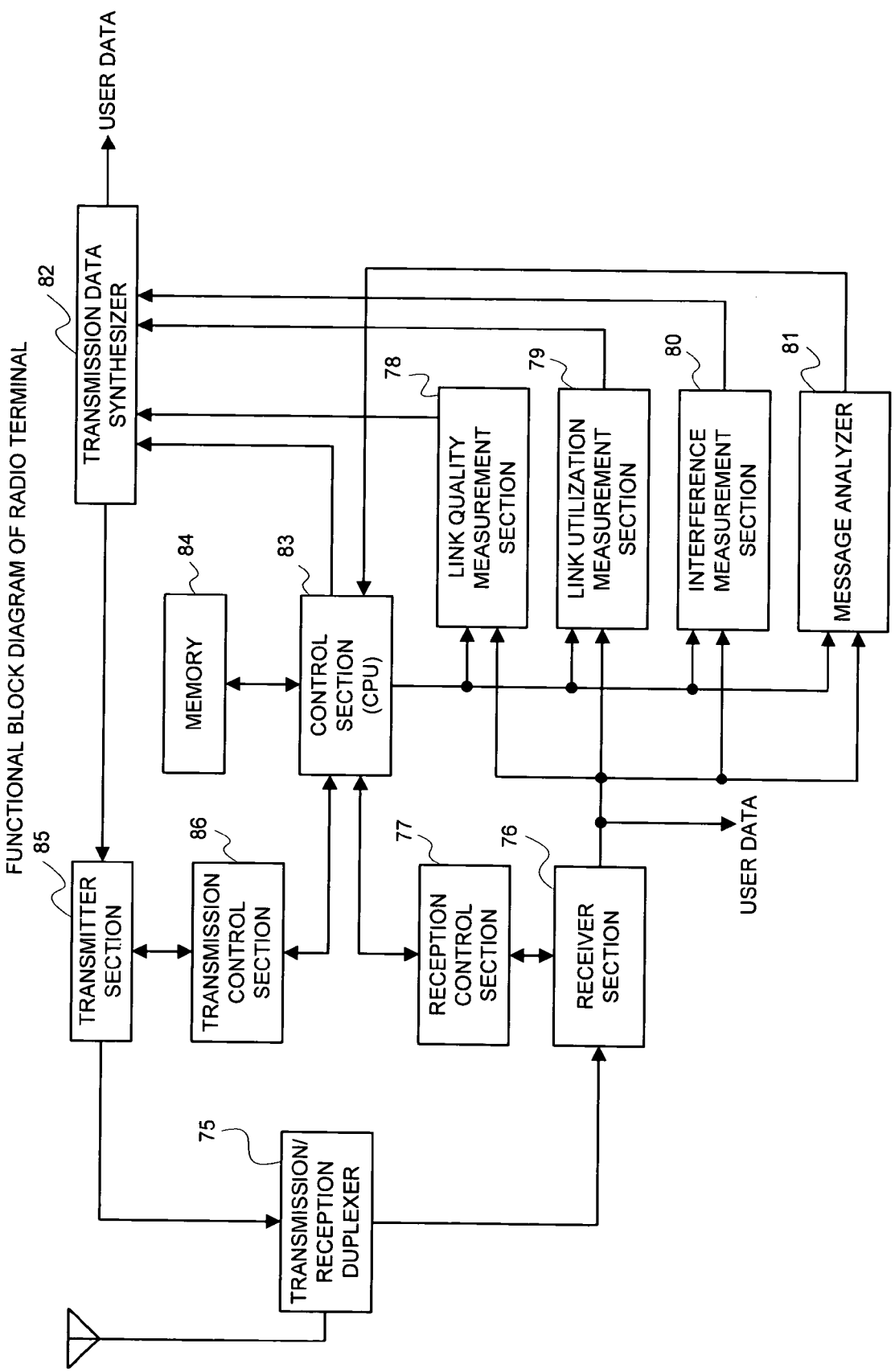
FIG. 13 is a functional block diagram illustrating a radio terminal according to the present invention.

FIG. 13 is a block diagram illustrating the function of a radio terminal in the above embodiment. The receiver section 76 receives a downstream received signal from an antenna via the transmission/reception duplexer 75 and then separates it into user data and various control signals. The various control signals are supplied to the link quality measurement section 78, the link utilization measurement section 79, the interference measurement section 80, and the message analyzer 81. The link quality measurement section 78 measures a radio link quality. The link utilization measuring section 79 measures radio link utilization. The interference measurement section 80 measures an interference amount. The message analyzer 81 analyzes various messages from the radio resource management server. The message may be often transmitted via a radio base station.

The control section 83, or CPU, performs various types of control to the reception control section 77 and the transmission control section 86, that is, frequency change control, transmission power control, and base station change control, and the like, according to the message analysis results. The transmission data synthesizer 82 synthesizes the above-mentioned various types of measurement information with the upstream user data and then transmits the analysis results to the transmitter section 85. The transmitter section 85 performs an upstream transmission via the transmission/reception duplexer 75. The memory 84 is a working memory for the CPU 83 or a memory storing a control program for the radio terminal.

Figure 14:
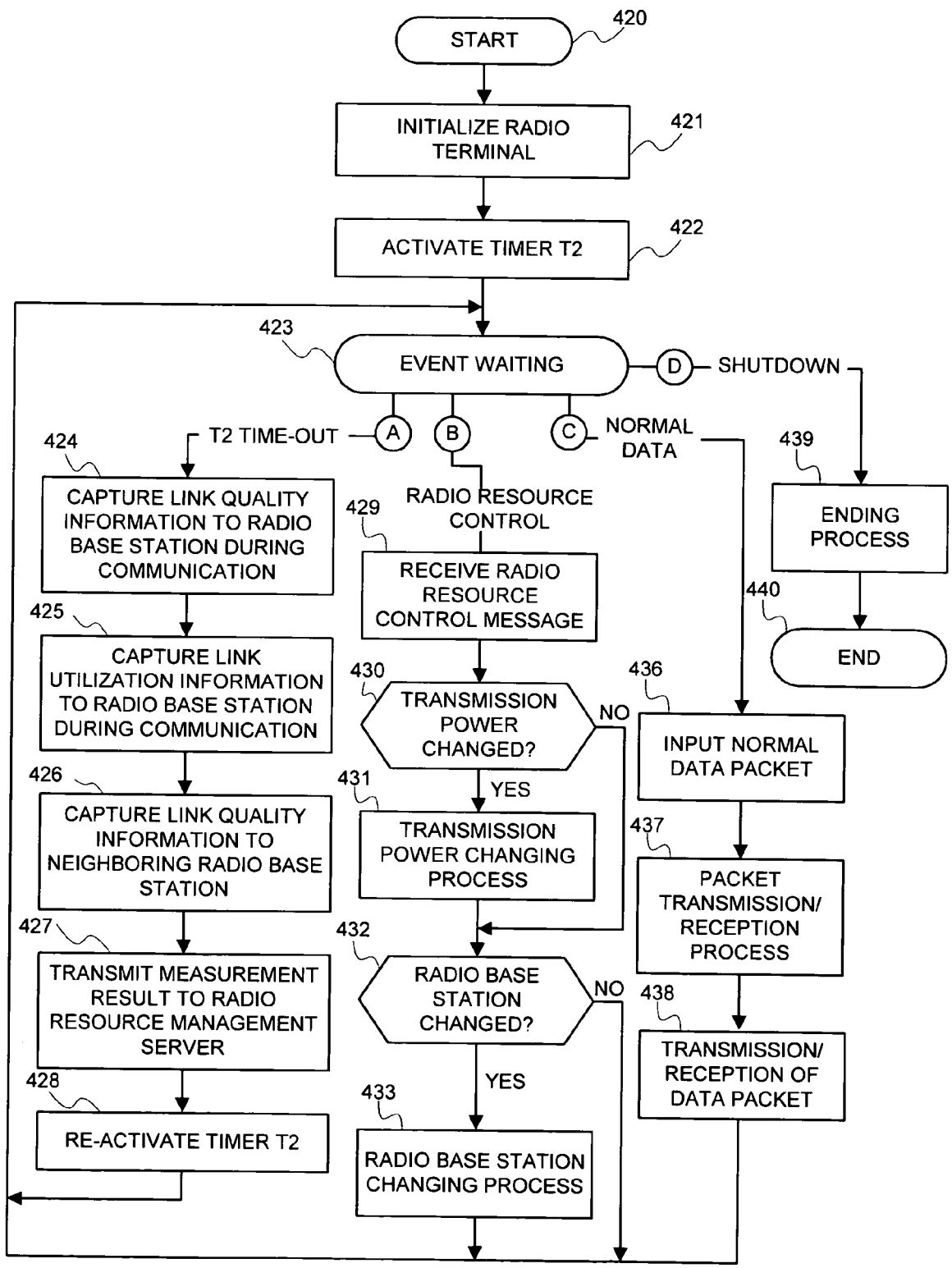
FIG. 14 is an operational flowchart for the radio terminal shown in FIG. 13.

FIG. 14 is a flowchart showing the operation of a radio terminal according to the third embodiment of the present invention. A radio terminal initializes after booting, sets a frequency channel or a transmission power, and links to a neighboring radio base station. Then, the radio terminal obtains information such as the address thereof or the address of the radio resource management server and then performs various configurations (step 421). Next, the radio terminal activates the timer T2 (step 422) and then becomes an event waiting state (step 423). The value of the timer T2 determines the interval at which the radio terminal notifies the radio resource management server of the radio link measured result.

Every time the timer T2 reaches a timeout, the radio terminal captures the radio link quality information to a radio base station during communication (step 424), the radio link utilization information to a radio base station during communication (step 425), and the link quality information (interference information) to a neighboring radio base station (step 426). Thereafter, the radio terminal transmits the measured results to the radio resource management server (step 427) and then re-activates the timer T2 (step 428). Thus, the radio terminal returns to an event-waiting state.

Next, when the radio terminal receives a radio resource control message from the radio resource management server (step 429), it changes the transmission power to a specified value (step 431) if the control content is a transmission power change request (step 430). If the control content is a radio base station change request (step 432), the radio terminal hands it over the specified radio base station (step 433). When receiving normal data, the radio terminal performs a packet transmission/reception process (steps 436 to 438). When the shutdown process is initiated, the radio terminal performs an ending process and then ends it (steps 439 to 440).

Figure 15:
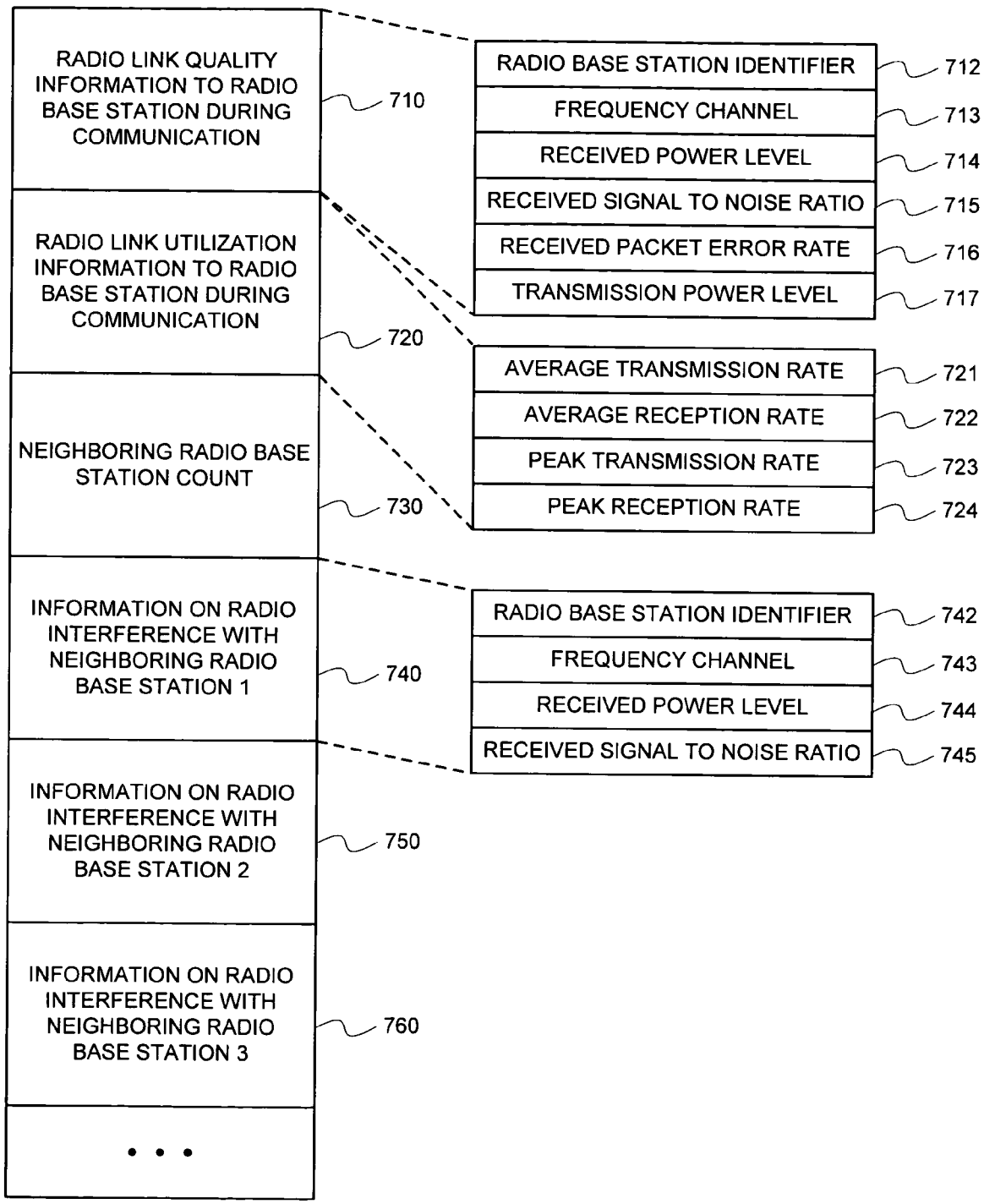
FIG. 15 is a diagram showing the content of radio link measurement information to be transmitted from a radio terminal to a radio resource management server, according to the present invention.

FIG. 15 is a diagram showing the content of the radio link measurement information 700 transmitted from a radio terminal to the radio resource management server, according to the following embodiment. The radio link measurement information 700 is formed of radio link quality information 710 to a radio base station during communication, radio link utilization information 720 to a radio base station during communication, a neighboring radio base station count 730, radio interference quality information 740 to a neighboring radio base station 1, radio interference quality information 750 to a neighboring radio base station 2, radio interference quality information 760 to a neighboring radio base station 3, . . . and so on.

The radio link quality information 710 to a radio base station during communication consists of a radio base station identifier 712, a frequency channel 713, a received power level 714, a received signal to noise ratio 715, a received packet error rate 716, and a transmission power level 717. The radio link utilization information 720 to a radio base station during communication includes an average transmission rate 721, an average reception rate 722, a peak transmission rate 723, and a peak reception rate 724.

The radio interference information 740 to the neighboring radio base station 1 includes a radio base station identifier 742, a frequency channel 743, a received power level 744, and a received signal to noise ratio 745. Sets of notification information mentioned above have the same meaning as those shown in FIG. 4.

Sets of radio link utilization information 720 to radio base stations during communication, gathered from respective radio terminals, are summed every radio base station. The sum value is equal to the radio link utilization information 620 measured by the radio base station itself. Moreover, radio interference information 640 to 660 to a neighboring base station, measured by a radio base station, can be analogized to some extent based on the interference information 740 to 760 to a neighboring radio base station, measured by the radio terminal. For example, it may be assumed that radio terminals are uniformly distributed around a radio base station. In such a case, by averaging received levels of neighboring radio base stations, measured by plural radio terminals, an interference amount from neighboring radio base stations, to which a radio base station followed by a radio terminal is exposed, can be estimated.

When there is a group of radio terminals with the notification function of the radio link measurement information shown in FIG. 15 under the conventional radio base station, which has no notification function of the radio link measurement information 600 shown in FIG. 4, the radio resource management server can analogize the radio link quality and utilization of each radio base station and a degree of interference with other radio base station, based on the radio link measurement information 700 gathered by the radio terminal group. In this embodiment utilizing the fact, the radio resource management server implements a radio resource management process such as load distributed control, transmission control, frequency change control, and the like, based on the radio link measurement information 700 gathered from radio terminals.

The communication protocol for transmitting radio link measurement information from radio terminals to the radio resource management server is not limited. For example, SNMP (Simple Network Management Protocol, RFC2570-2576) is used as the protocol suitable for transferring such network management information. The measurement information 700 may be transmitted or not be transmitted from a radio terminal to the radio resource management server via the radio base station. In the transmission via the radio base station, a radio base station gathers sets of measurement information 700 from slave radio terminals and then transmits them to the radio resource management server. This allows effective transmission. Similarly, the communication protocol for transmitting the radio link measurement information 600 from a radio base station to the radio resource management server is applicable to the first and second embodiments.

Figure 16:
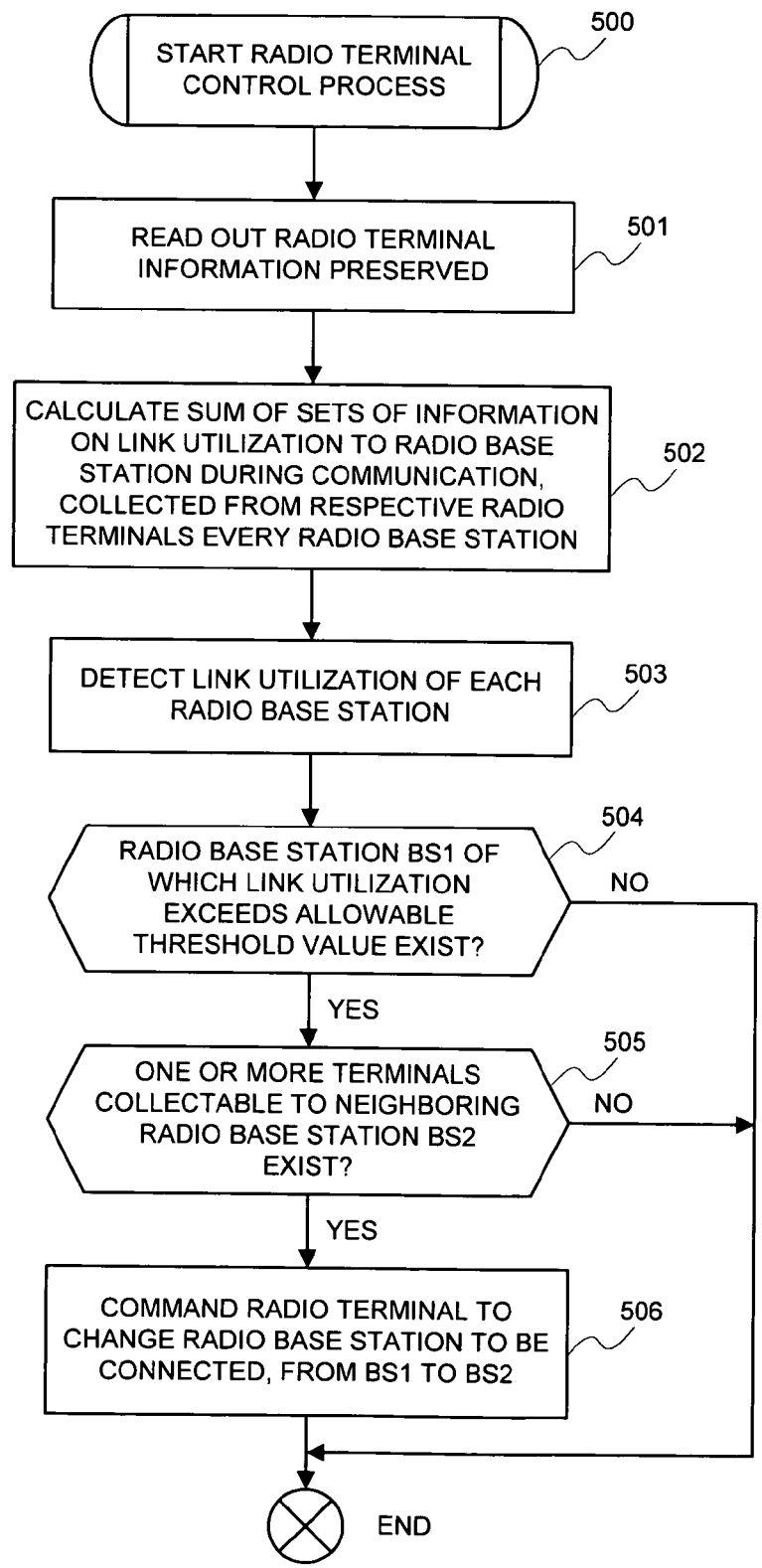
FIG. 16 is an operatinal flowchart for load distributed control of a radio resource management server, according to a third embodiment of the present invention.

FIG. 16 is an operational flowchart for the third embodiment of the present invention, showing that a radio resource management server indicates hand-over to a radio terminal and performs load distribution between radio base stations. First, the radio terminal information saved is read out (step 501). Sets of link utilization information 720 to radio base stations during communication, collected from respective radio terminals, are summed every radio base station (step 502). The sum, as described previously, is equal to the radio link utilization 620 (referred to FIG. 4) measured by the radio base station (step 503).

It is now assumed that the radio base station BS1 has the radio link utilization exceeding a predetermined allowable value (step S504) and that the neighboring radio base station BS2 includes at least one connectable radio terminal, which has a radio utilization lower than an allowable value (step 505). In such a case, the radio resource management server commands the radio terminal to switch the radio base station from BS1 to BS2 (step 506).

Figure 17:
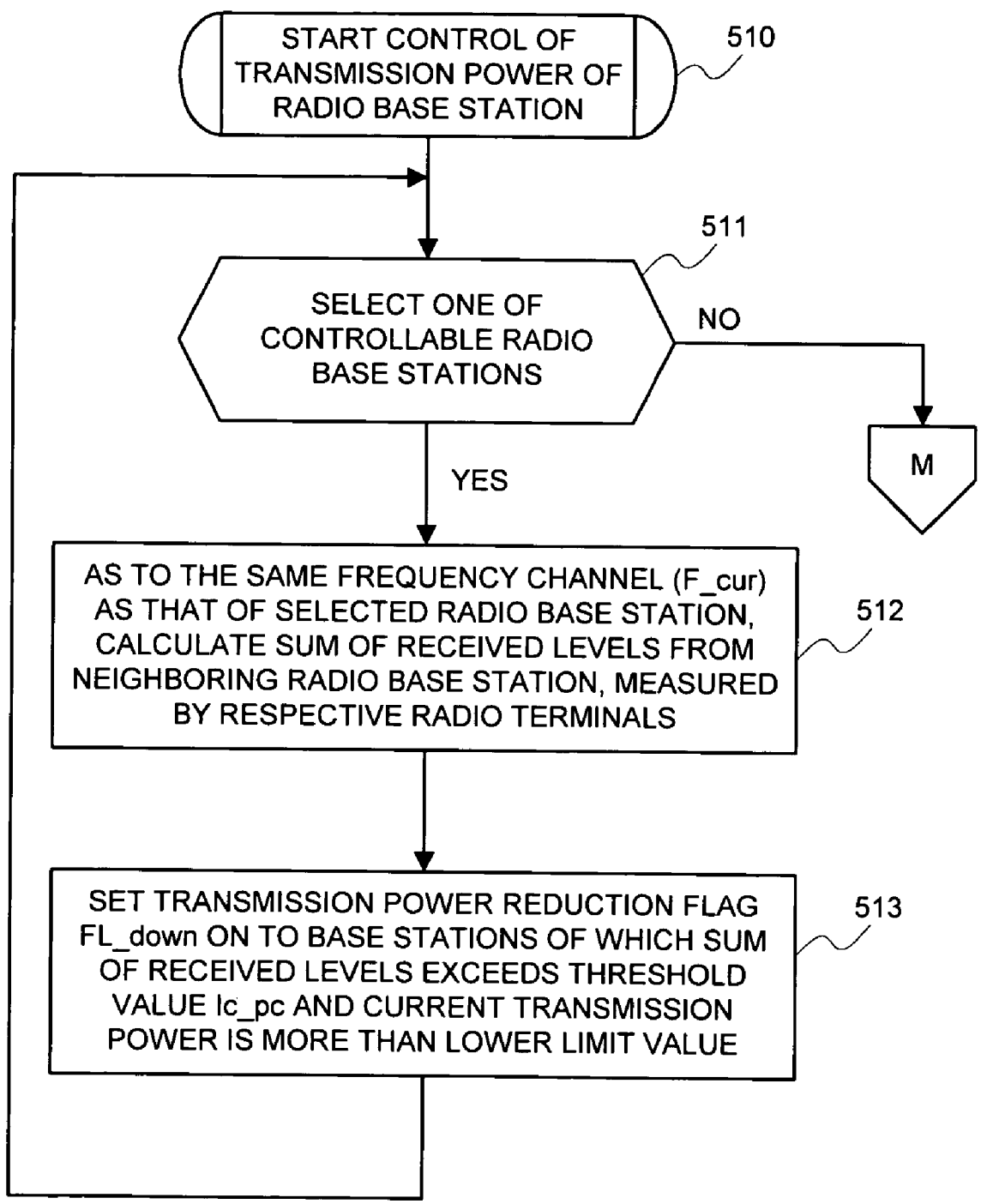
FIG. 17 is a diagram partially showing an operational flow for transmission power control of a radio resource management server, according to a fourth embodiment of the present invention.
Figure 18:
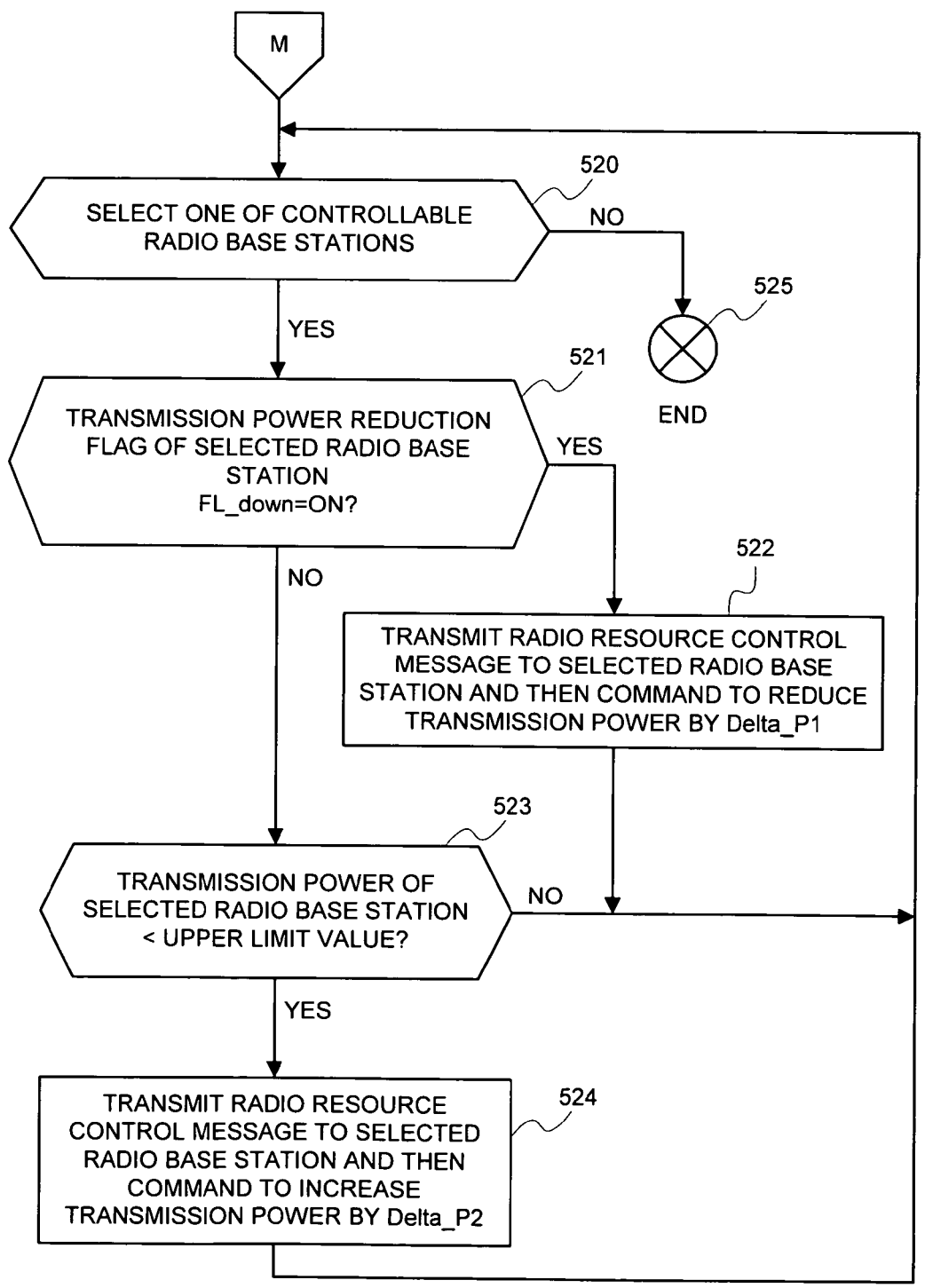
FIG. 18 is a diagram partially showing an operational flow for the transmission power control of the radio resource management server according to a fourth embodiment of the present invention.

Next, a fourth embodiment of the present invention will be described below. In this embodiment, a radio resource management server controls the transmission power of radio base stations, using the radio link measurement information 700 from radio terminals. FIGS. 17 and 18 show the operational flow for the transmission power control. First, one controllable radio base station 1 is selected (step 511). As to the same frequency channel (F_cur) as that of the selected radio base station, received levels from neighboring base stations measured by respective ratio terminals are summed (step 512). In order to control the base station, where the sum of the received levels exceeds the threshold value Ic_pc and the current transmission power is more than the lower limit value, in the interference amount decreasing direction, the transmission power reduction flag FL_down is made ON (step 513).

When the controllable radio base stations have been completely processed as described above, one controllable radio base station is selected as shown in FIG. 18 (step 520). If the transmission power reduction flag, FL_down, of the selected radio base station is in an on state (step 521), the radio resource management server transmits a radio resource control message to the selected radio base station and commands to reduce the transmission power by Delta_P1 (step 522).

Let us now consider that, when the flag FL_down is in an off state in the step 521, the transmission power of the selected radio base station is less than the upper limit value (step 523). In such a case, the radio resource management server transmits a radio resource control message to the selected radio base station and commands to increase the transmission power by Delta_P2 (step 524). Thus, boosting the transmission power so long as interference does not arise can widen the network cover area of a radio business owner.

Figure 19:
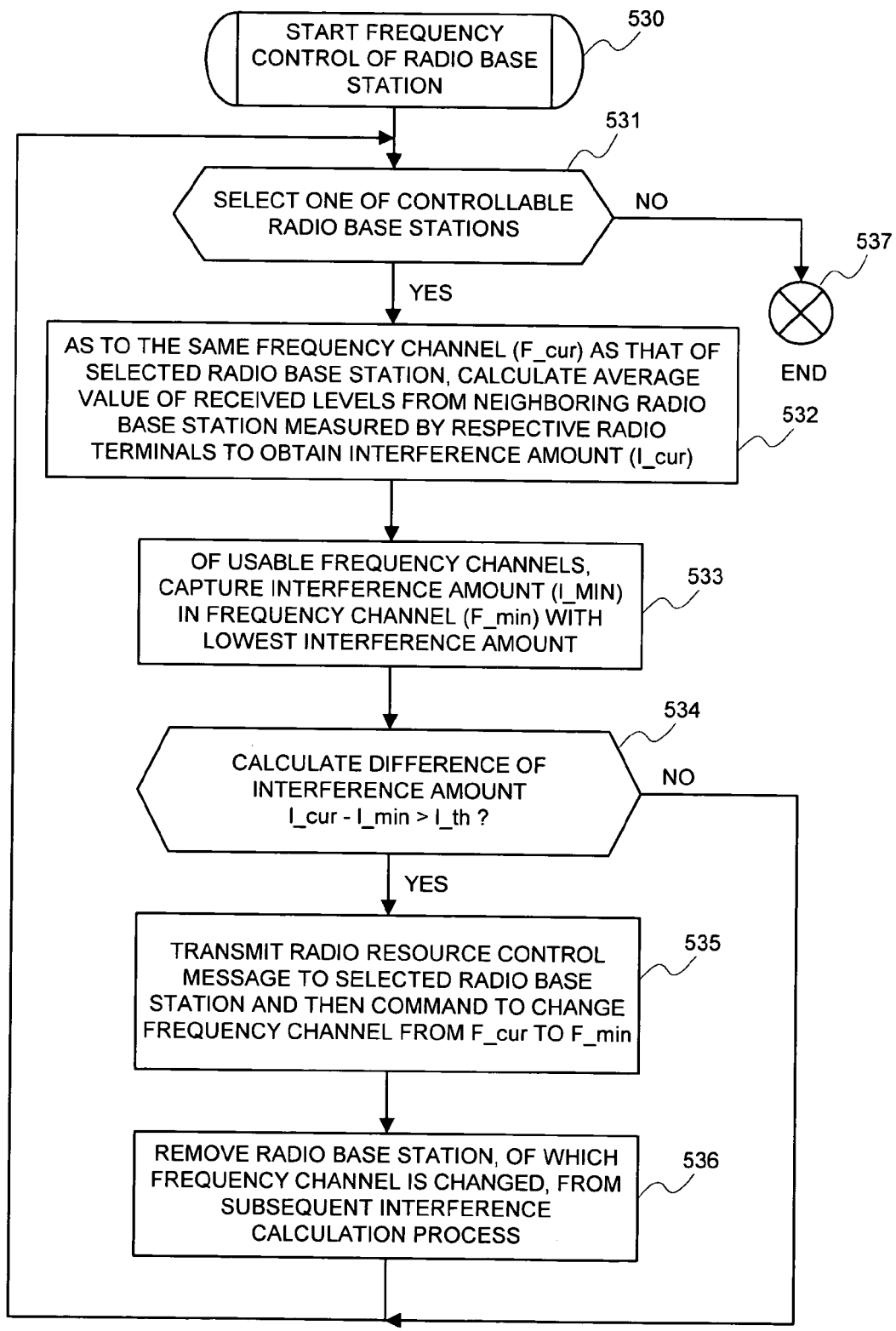
FIG. 19 is an operatinal flowchart for the frequency control of the radio resource management server according to a fifth embodiment of the present invention.

Next, the fifth embodiment of the present invention will be described by referring to the operational flow shown FIG. 19. In this embodiment, the radio resource management server controls the frequency of a radio base station, using the radio link measurement information 700 from radio terminals. The radio resource management server selects one of controllable radio base stations by referring to radio link measurement information, which is received from radio terminals and saved (step 531). As to the same frequency channel, F_cur, as that in the selected radio base station, an average value of received levels from neighboring radio base stations, measured by respective radio terminals is calculated as an interference amount (I_cur) (step 532).

As described previously, it is assumed that the radio terminals are uniformly distributed around the radio base station. Using the average value of received levels from neighboring radio base stations, measured by plural radio terminals, an interference amount from a neighboring radio base station influenced by radio base station to radio terminals to which radio terminals belong can be estimated.

Of the frequency channels usable by the radio base station itself, the interference amount (I_min) of the frequency channel (F_min) with a minimum interference amount is captured (step 533). When the difference, I_cur−I_min, in interference amount is larger than a predetermined threshold value I_th (step 534), the radio resource management server transmits a radio resource control message to a selected radio base station. After the radio resource management server indicates changing the frequency channel from F_cur to F_min (step 535), the radio base station, of which the frequency channel is changed, is excluded from the following interference calculation process (step 536). The process ends when there are no information on radio base stations to be selected (step 537).

Figure 20:
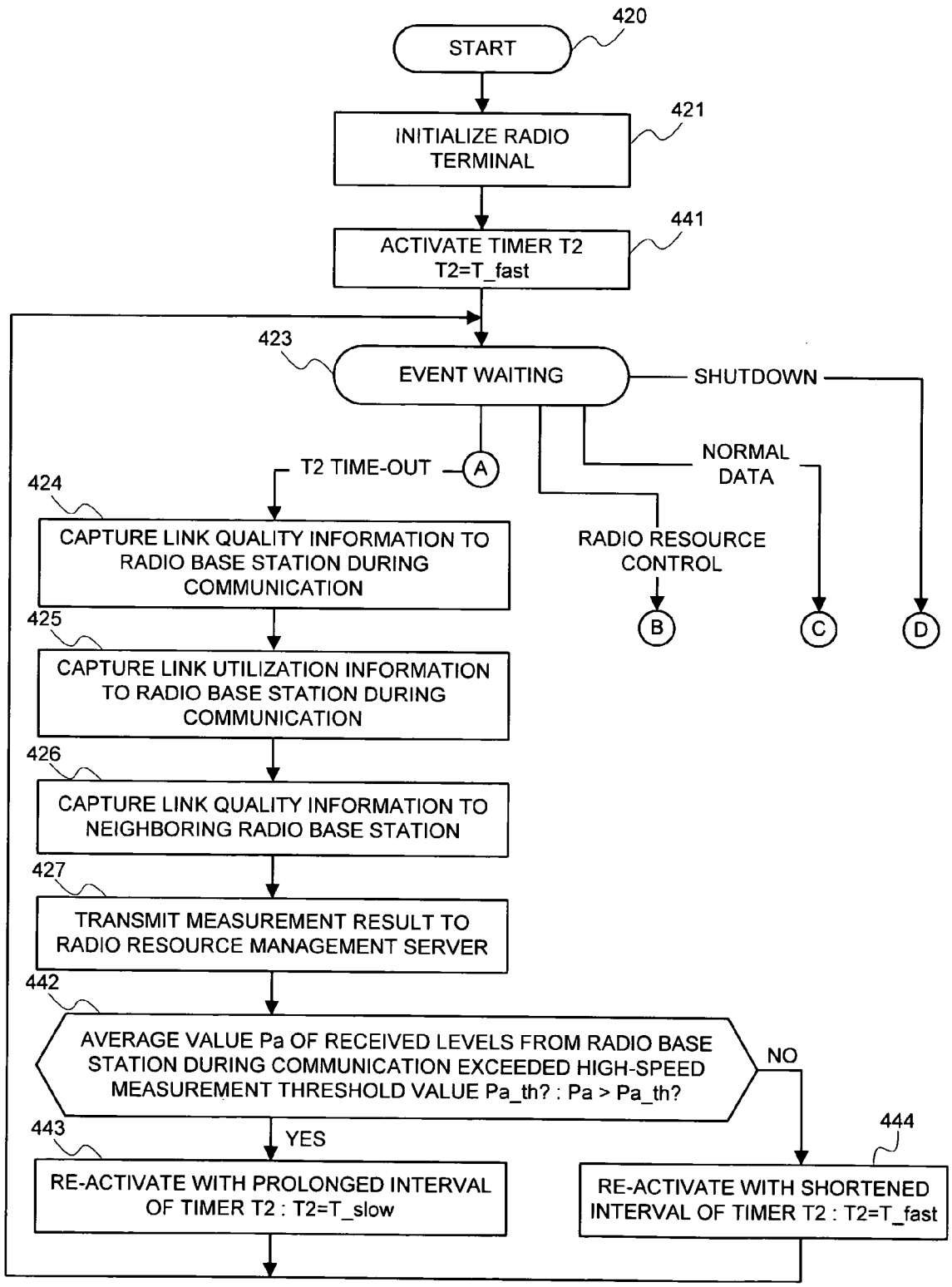
FIG. 20 is an operational flowchart for a radio terminal according to a sixth embodiment of the present invention.

FIG. 20 shows an operational flowchart for a radio terminal according to the sixth embodiment. In this embodiment, when a radio terminal notifies the radio resource management server of a link quality, the timer value is switched in two steps according to the link quality. In an initial state, the value of the timer T2 is set to T_fast having a shorter interval (step 441). When the received level average value Pa from the radio base station during communication exceeds the fast measurement threshold value Pa_th and stabilizes with a better quality, the value of the timer T2 is changed to T_slow having a longer interval (step 443).

On the other hand, when the received level average value Pa is less than the fast measurement threshold value Pa_th, the interval of the timer T2 is shortened to T_fast. Thus, the timer T2 is re-activated (step 444). Similar control may be applied to radio base stations. As described above, prolonging the interval of notification while the quality is good relieves the notification traffic volume for control. Thus, congestion of a network can be alleviated.

FIG. 21 shows an operational flowchart for a radio terminal according to the seventh embodiment of the present invention. Similarly, when a radio terminal notifies the radio resource management server of a link quality, the timer value is switched in two steps but the reference for changing is determined with the dispersion value of a received level. When the received level dispersion value Pd from a radio base station during communication is less than a fast measurement threshold value Pd_th (step 445), the measurement interval T2 is prolonged, by assuming that the variation in quality is alleviative (step 443). When the distribution value Pd exceeds Pd_th, the measurement interval T2 is reset shorter (step 444). Similar control may be applied to the operation of the radio base station shown in FIG. 3.

In the first and second embodiments of the present invention as described above, the transmission power of each radio base station is controlled on occurrence of interference. For that reason, when the transmission power stabilizes once, oscillation of a service area does not arise. Accordingly, the embodiments have the advantage in that the radio resources can be managed stably and efficiently.

Moreover, according to the third to seventh embodiments, the load distributed control, transmission power control, and frequency channel change control of a radio base station are performed using only radio link measurement information from radio terminals. Accordingly, the radio base station may use the conventional existing hardware and software, without any change. Hence, the present invention has the advantage in that radio resources can be effectively managed without modifying the existing base stations.

What is claimed is:

1. A radio resource management method comprising the control steps of:

detecting the occurrence of interference between service areas provided by plural radio base stations;

controlling transmission power of a common control signal, which governs a scope of a service area that a radio base station forms, for interference suppression in response to said occurrence of interference between service areas provided by plural radio base stations;

detecting the occurrence of interference based on radio link quality information notified from each of said radio base stations;

wherein said radio link quality information comprises at least a radio link reception level; and wherein said control step comprises the step of controllably reducing the transmission power of a radio base station, of which a reception level exceeds a predetermined threshold value and a current transmission power is more than a lower limit value, of radio base stations using the same frequency as a frequency currently used by said radio base station.

2. A radio resource management apparatus comprising:

a detector for detecting the occurrence of interference between service areas provided by plural radio base stations; and a controller for controlling transmission power of a common control signal, which governs a scope of a service area that a radio base station forms, for interference suppression in response to said occurrence of interference between service areas provided by plural radio base stations;

wherein the occurrence of interference is detected based on radio link quality information notified from each of said radio base stations; and wherein said radio link quality information comprises at least a radio link reception level; and wherein said controller comprises means for controllably reducing the transmission power of a radio base station, of which a reception level exceeds a predetermined threshold value and a current transmission power is more than a lower limit value, of radio base stations using the same frequency as a frequency currently used by said radio base station.

3. A radio base station in a radio communication system, said radio communication system including plural radio base stations each which provides a service area and a radio resource management apparatus for managing radio resources of said radio base stations, comprising:
- means for measuring a radio link quality and then notifying a radio resource management apparatus of radio link quality information being a measurement result; and
- means for responding transmission power control issued from said radio resource management apparatus and then controllably changing transmission power of a common control signal, which governs a scope of service area that a radio base station forms, to suppress interference between service areas detected based on said measurement result in said radio resource management apparatus.

4. The radio base station defined in claim 3, wherein said notification means performs a notification operation at predetermined notification intervals.

5. The radio base station defined in claim 4, wherein when said radio link quality exceeds a predetermined threshold value, said notification interval is set longer than said threshold value.

6. The radio base station defined in claim 4, wherein when a distribution value of a radio link quality measured within a fixed period exceeds a predetermined threshold value, said notification interval is set longer than said threshold value.

7. A radio resource management method comprising the steps of:
- detecting the occurrence of interference between service areas provided by plural radio base stations;
- controlling transmission power of a common control signal, which governs a scope of a service area that a radio base station forms, to suppress the interference autonomously by each of said plural radio base stations;
- measuring information on a radio link quality in each of said radio base stations and then mutually notifying other radio base stations of measured information; and
- controllably reducing the transmission power thereof when a radio base station providing a maximum interference to other stations is specified based on said radio link quality information notified.

8. The radio resource management method defined in claim 7, wherein, when said maximum interference amount exceeds a predetermined value, said transmission power is reduced controllably.

9. A radio base station comprising:
- detector for detecting the occurrence of interference between service areas provided by plural radio base stations;
- controller for controlling transmission power of a common control signal, which governs a scope of service area that a radio base station forms, to suppress interference autonomously in response to said occurrence of interference between plural service areas;
- means for measuring information on a radio link quality and then mutually notifying other radio base stations of measured information; and
- means for controllably reducing transmission power when a maximum interference is provided to other station based on the radio link quality information notified from other radio base station.

10. The radio base station defined in claim 9, when said maximum interference amount exceeds a predetermined value, said transmission power is reduced controllably.

11. A radio resource management method comprising the steps of:
- receiving information of radio link qualities from plural radio terminals; and
- controlling transmission power of a radio base station based on said information of radio link qualities from plural radio terminals,
- wherein said radio link quality information has a reception level from a neighboring radio base station measured by each of said radio terminals; and wherein said control step comprises the step of controlling transmission power of said radio base station based on the sum of reception levels from neighboring radio base stations of the same frequency as the frequency used by an interested radio base station.

12. The radio resource management method defined in claim 11, wherein said control step comprises the step of controllably reducing a transmission power of a base station where the sum of said reception levels exceeds a predetermined threshold value and the current transmission power is more than a lower limit value.

13. A radio resource management apparatus comprising:
- receiver for receiving information of radio link qualities from plural radio terminals; and
- controller for controlling transmission power of a radio base station based on said information of radio link qualities from plural radio terminals,
- wherein said radio link quality information has a reception level from a neighboring radio base station measured by each of said radio terminals; and wherein said control means comprises the step of controlling transmission power of said radio base station based on the sum of reception levels from neighboring radio base stations of the same frequency as the frequency used by an interested radio base station.

14. The radio resource management apparatus defined in claim 13, wherein said controller comprises means of controllably reducing the transmission power of a base station where the sum of said reception levels exceeds a predetermined threshold value and the current transmission power is more than a lower limit value.

15. A radio resource management method comprising the steps of:
- receiving information of radio link qualities from plural radio terminals; and
- controllably changing a frequency used by a radio base station based on said information of radio link qualities from plural radio terminals,
- wherein said radio link quality information has a reception level from a neighboring radio base station measured by each of radio terminals; and wherein said control step comprises the step of controlling the frequency of said radio base station based on an interference amount being an average value of reception levels from neighboring radio base stations of the same frequency as the frequency used by an interested radio base station.

16. A radio resource management apparatus comprising:
- a controller that changes a frequency used by a radio base station based on radio link quality information provided by plural radio terminals,
- wherein said radio link quality information has a reception level from a neighboring radio base station measured by each of said radio terminals; and
- wherein said controller controls the frequency of the radio base station based on an interference amount being an average value of reception levels from neighboring radio base stations of the same frequency as the frequency used by an interested radio base station.

17. A radio terminal comprising:
- means for measuring a radio link quality and then notifying a radio resource management apparatus of radio link quality information being the measurement result, the notifying means performing a notifying operation at predetermined notification intervals; and means for responding distributed control indication for a load being a radio terminal accommodated in a radio base station, based on said radio link quality information, said distributed control indication being created from said radio resource management apparatus, and switching a radio base station to be connected, wherein when a radio link quality exceeds a predetermined threshold value, said notification interval is set longer than that in the case of less than said threshold value.

18. A radio terminal comprising:

means for measuring a radio link quality and then notifying a radio resource management apparatus of radio link quality information being the measurement result, the notifying means performing a notifying operation at predetermined notification intervals; and means for responding distributed control indication for a load being a radio terminal accommodated in a radio base station, based on said radio link quality information, said distributed control indication being created from said radio resource management apparatus, and switching a radio base station to be connected, wherein when a distribution value of a radio link quality measured within a fixed period exceeds a predetermined threshold value, said notification interval is set longer than that in the case of less than said threshold value.

* * * * *